(12) United States Patent
Reis et al.

(10) Patent No.: US 12,552,763 B2
(45) Date of Patent: Feb. 17, 2026

(54) METHODS OF PROTECTING AGAINST NEURODEGENERATION

(71) Applicants: BioVentures, LLC, Little Rock, AR (US); The United States As Represented By The Department of Veterans Affairs, Washington, DC (US)

(72) Inventors: Robert Shmookler Reis, Little Rock, AR (US); Peter Crooks, Little Rock, AR (US); Srinivas Ayyadevara, Little Rock, AR (US)

(73) Assignees: BioVentures, LLC; The United States As Represented By The Department of Veterans Affairs

( * ) Notice: Subject to any disclaimer, the term of this patent is extended or adjusted under 35 U.S.C. 154(b) by 0 days.

(21) Appl. No.: 16/483,366

(22) PCT Filed: Feb. 2, 2018

(86) PCT No.: PCT/US2018/016697
§ 371 (c)(1),
(2) Date: Aug. 2, 2019

(87) PCT Pub. No.: WO2018/144910
PCT Pub. Date: Aug. 9, 2018

(65) Prior Publication Data
US 2020/0024249 A1    Jan. 23, 2020

Related U.S. Application Data

(60) Provisional application No. 62/453,886, filed on Feb. 2, 2017.

(51) Int. Cl.
*C07D 333/60* (2006.01)
*C07D 209/18* (2006.01)
*C07D 307/80* (2006.01)

(52) U.S. Cl.
CPC ......... *C07D 333/60* (2013.01); *C07D 209/18* (2013.01); *C07D 307/80* (2013.01)

(58) Field of Classification Search
CPC .. C07D 333/60; C07D 209/18; C07D 307/80; A61P 25/28; A61P 25/16
See application file for complete search history.

(56) References Cited

U.S. PATENT DOCUMENTS 3,642,813 A    2/1972    Rudolf et al.
4,241,046 A   12/1980    Papahadjopoulos et al.
(Continued)

FOREIGN PATENT DOCUMENTS

CN    101220054 A    7/2008
DE    1944419 A1    3/1971
(Continued)

OTHER PUBLICATIONS

Bhatnagar, I. et al., "Oxidation of Phenylhydrazones with Manganese Dioxide," J. Org. Chem., Jul. 1967, pp. 2252-2256, vol. 32.
(Continued)

*Primary Examiner* — Renee Claytor
*Assistant Examiner* — Andrew P Lee
(74) *Attorney, Agent, or Firm* — Polsinelli PC

(57) ABSTRACT

The disclosure provides a method of preventing or reducing protein aggregates using combretastatin-A4 (CA4) or an analog thereof. The disclosure also provides methods of reducing the risk, delaying the onset, delaying or slowing the progression, or reversing the signs or symptoms of a neurodegenerative (or other age-progressive) disease using a combretastatin-A4 (CA4) or an analog thereof. The combretastatin-A4 (CA4) or an analog thereof may bind glial fibrillary acidic protein (GFAP). The combretastatin-A4 (CA4) or an analog thereof is described by compounds of Formula (I).

(Continued)

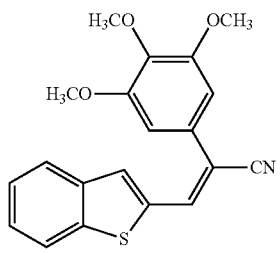

7 Claims, 9 Drawing Sheets
(8 of 9 Drawing Sheet(s) Filed in Color)

(56) References Cited

U.S. PATENT DOCUMENTS

| | | | |
|---|---|---|---|
| 4,394,448 A | 7/1983 | Szoka, Jr. et al. | |
| 4,529,561 A | 7/1985 | Hunt et al. | |
| 4,755,388 A | 7/1988 | Heath et al. | |
| 4,828,837 A | 5/1989 | Uster et al. | |
| 4,925,661 A | 5/1990 | Huang | |
| 4,954,345 A | 9/1990 | Muller | |
| 4,957,735 A | 9/1990 | Huang | |
| 4,996,237 A | 2/1991 | Pettit et al. | |
| 5,043,164 A | 8/1991 | Huang et al. | |
| 5,064,655 A | 11/1991 | Uster et al. | |
| 5,077,211 A | 12/1991 | Yarosh | |
| 5,264,618 A | 11/1993 | Felgner et al. | |
| 5,484,940 A | 1/1996 | Grant et al. | |
| 5,561,122 A | 10/1996 | Pettit | |
| 6,743,937 B2 | 6/2004 | Seyedi et al. | |
| 6,855,702 B2 | 2/2005 | Venit et al. | |
| 7,659,262 B2 | 2/2010 | Venit et al. | |
| 9,597,316 B2 | 3/2017 | Penthala et al. | |
| 9,884,842 B2 | 2/2018 | Penthala et al. | |
| 9,938,246 B2 | 4/2018 | Madadi et al. | |
| 10,100,029 B2 | 10/2018 | Penthala et al. | |
| 10,239,844 B2 | 3/2019 | Madadi et al. | |
| 2004/0248950 A1 | 12/2004 | Shizuka et al. | |
| 2007/0238699 A1 | 10/2007 | Demko et al. | |
| 2007/0249647 A1* | 10/2007 | Vander Jagt | A61K 31/525 514/277 |
| 2008/0113993 A1 | 5/2008 | De Belin et al. | |
| 2009/0253656 A1 | 10/2009 | Yamazaki et al. | |
| 2010/0081678 A1 | 4/2010 | Crooks et al. | |
| 2010/0144734 A1 | 6/2010 | Hou et al. | |
| 2011/0053941 A1 | 3/2011 | Mautino et al. | |
| 2011/0077250 A1 | 3/2011 | Ryder | |
| 2011/0124899 A1 | 5/2011 | Frederic et al. | |
| 2011/0144139 A1 | 6/2011 | Vasioukhin et al. | |
| 2011/0251236 A1 | 10/2011 | Lai et al. | |
| 2013/0137740 A1 | 5/2013 | Schobert et al. | |
| 2015/0031653 A1 | 1/2015 | Mathisen et al. | |
| 2015/0328216 A1 | 11/2015 | Penthala et al. | |
| 2016/0068506 A1 | 3/2016 | Penthala et al. | |
| 2016/0075689 A1 | 3/2016 | Penthala et al. | |
| 2017/0015635 A1 | 1/2017 | Madadi et al. | |
| 2018/0118710 A1 | 5/2018 | Penthala et al. | |
| 2018/0186756 A1 | 7/2018 | Madadi et al. | |

FOREIGN PATENT DOCUMENTS

| | | | |
|---|---|---|---|
| DE | 3410700 A1 | 9/1985 | |
| EP | 0754682 A1 | 1/1997 | |
| EP | 1921072 A1 | 5/2008 | |
| JP | 2012208173 A | 10/2012 | |
| WO | 1992004334 A1 | 3/1992 | |
| WO | 1994005682 A1 | 3/1994 | |
| WO | 1999035150 A1 | 7/1999 | |
| WO | 2000035865 A2 | 6/2000 | |
| WO | 2001081355 A1 | 11/2001 | |
| WO | 2001093841 A2 | 12/2001 | |
| WO | 2003042207 A1 | 5/2003 | |
| WO | WO-2006094235 A1 * | 9/2006 | ............ A61P 21/00 |
| WO | 2008131320 A1 | 10/2008 | |
| WO | 2010150211 A2 | 12/2010 | |
| WO | 2011127192 A2 | 10/2011 | |
| WO | 2014105957 A1 | 7/2014 | |
| WO | 2014172363 A2 | 10/2014 | |
| WO | 2014176351 A1 | 10/2014 | |
| WO | 2015153635 A1 | 10/2015 | |
| WO | 2018144910 A1 | 8/2018 | |

OTHER PUBLICATIONS

Butler, R. et al., "A Ceric Ammonium Nitrate N-Dearylation of N-p-Anisylazoles Applied to Pyrazole, Triazole, Tetrazole, and Pentazole Rings: Release of Parent Azoles. Generation of Unstable Pentazole, HN5/N5-, in Solution," J. Org. Chem., Feb. 2008, pp. 1354-1364, vol. 73, No. 4.

Carta, A. et al., "3-Aryl-2-[1H-benzotriazol-1-yl]acrylonitriles: A novel class of potent tubulin inhibitors," Eur. J. Med. Chem., Jun. 11, 2011, pp. 4151-4167, vol. 46, No. 9, Elsevier Masson SAS, Paris, France.

Cheng, X. et al., "Effects of resveratrol on hippocampal astrocytes and expression of TNF-alpha in Alzheimer's disease model rat," Wei Sheng Yan Jiu, Jul. 2015, pp. 610-614, vol. 44, No. 4, Abstract Only.

Coggins, G. et al., "N-Aroyl Indole Thiobarbituric Acids as Inhibitors of DNA Repair and Replication Stress Response Polymerases," NIH Public Access Author Manuscript, Aug. 16, 2014, pp. 1-19, published in final edited form as: ACS Chem Biol., Aug. 16, 2013, pp. 1722-1729, vol. 8, No. 8.

Corrected Search Report and Written Opinion mailed Oct. 12, 2016 from related Singaporean Patent Application No. 11201508054U; 11 pgs.

Dhayalan, V. et al., "Studies on Lewis-acid mediated domino reaction of N-protected bromomethylindoles with arenes/heteroarenes," Indian Journal of Chemistry, Jun. 2011, pp. 843-857, vol. 50B.

Do-Thi, A. et al., "Combination of grafted Schwann cells and lentiviral-mediated prevention of glial scar formation improve recovery of spinal cord injured rats," J. Chem. Neuroanat., 2016, pp. 48-60, vol. 76.

Extended European Search Report dated May 12, 2016 from related European Patent Application No. 13868363.6; 6 pgs.

Extended European Search Report dated Jan. 12, 2017 from related European Patent Application No. 14785256.0; 14 pgs.

Extended European Search Report dated Oct. 18, 2016 from related European Patent Application No. 14788020.7; 12 pgs.

Extended European Search Report dated Aug. 3, 2017 from related European Patent Application No. 15773146.4; 12 pgs.

Ge, J. et al., "The binding of resveratrol to monomer and fibril amyloid beta," Neurochem. Int., Dec. 2012, pp. 1192-1201, vol. 61, No. 7, Abstract Only.

Grundon, M. et al., "The Reactions of Hydrazones and Related Compounds with Strong Bases. Part 4. 4,5-Diaryl-1,2,3-triazoles from Aromatic Aldehyde Azines and from the Reaction of Arenecarbonitriles with Aryldiazomethanes," J. Chem. Soc. Perkin Trans. I, 1988, pp. 2917-2919, vol. 1.

Haldar, M. et al., "Synthesis of barbiturate-based methionine aminopeptidase-1 inhibitors," Bioorg. Med. Chem. Lett., Feb. 27, 2008, pp. 2373-2376, 2008, vol. 18, Elsevier Ltd.

Hou, D-R. et al., "1,2,3-Triazole derivatives as new cannabinoid CB1 receptor antagonists," Bioorg. Med. Chem. Lett., 2009, pp. 1022-1025, vol. 19, No. 3, Elsevier Ltd.

Hu, J-R. et al., "A one-pot synthesis of bisarylhydrazones by Cu(I)-catalyzed aerobic oxidation," Tetrahedron, 2013, pp. 9865-9869, vol. 69, No. 46, Elsevier Ltd.

International Search Report and Written Opinion dated Apr. 22, 2014 from related International Patent Application No. PCT/US2013/077812; 10 pgs.

(56) References Cited

OTHER PUBLICATIONS

International Search Report and Written Opinion dated Sep. 11, 2014 from related International Patent Application No. PCT/US2014/035169; 7 pgs.
International Search Report and Written Opinion dated Nov. 7, 2014 from related International Patent Application No. PCT/US2014/034185; 13 pgs.
International Search Report and Written Opinion dated Aug. 25, 2015 from related International Patent Application No. PCT/US2015/023628; 11 pgs.
International Search Report and Written Opinion dated Mar. 28, 2018 from related International Patent Application No. PCT/US2018/016697; 13 pgs.
Ishiki, A. et al., "Glial fibrillar acidic protein in cerebrospinal fluid of Alzheimer's disease, dementia with Lewy bodies, and frontotemporal lobar degeneration," J. Neurochem. 2016, pp. 258-261, vol. 136.
Jalily, P. et al., "Novel cyanocombretastatins as potent tubulin polymerization inhibitors," Bioorg. Med. Chem. Lett., Sep. 7, 2012, pp. 6731-6734, vol. 22, No. 21, Elsevier Ltd.
Kaur, J. et al., "N-1 and C-3 substituted indole Schiff bases as selective COX-2 inhibitors: Synthesis and biological evaluation," Bioorg. Med. Chem. Lett., Feb. 6, 2012, pp. 2154-2159, vol. 22, Elsevier Ltd.
Khadem, H. et al., "Reactions of Benzil Mono- and Bis-arylhydrazones," J. Chem. Soc., Jan. 1, 1968, pp. 949-951, vol. 8.
Kim, D-K. et al., "Synthesis and biological evaluation of novel 2-pyridinyl-[1,2,3]triazoles as inhibitors of transforming growth factor beta1 type 1 receptor," Bioorg. Med. Chem. Lett., May 17, 2004, pp. 2401-2405, vol. 14, No. 10, Elsevier Ltd.
Kubinyi, E., "3D QSAR in Drug Design Theory Methods and Applications: Ligand-Protein Interactions and Molecular Similarity," Springer, 1998, pp. 243-244, vol. 2-3.
Madadi, N. et al., "Synthesis and anti-proliferative activity of aromatic substituted 5-((1-benzyl-1H-indol-3-yl)methylene)-1,3-dimethylpyrimidine-2,4,6(1H,3H,5H)-trione analogs against human tumor cell lines," NIH Public Access Author Manuscript, Jan. 15, 2015, pp. 1-10, Published in final edited form as: Bioorg. Med. Chem. Lett., Jan. 15, 2014, pp. 601-603, vol. 24, No. 2.
Magarian, E. et al., "New Compounds: Acrylonitrile Derivatives as Potential Antineoplastic Agents," Journal of Pharmaceutical Sciences, Sep. 30, 1969, pp. 1166-1167, vol. 58, No. 9.
Mali, J. et al., "An efficient green protocol for the synthesis of 2-aryl substituted benzothiazoles," Green Chemistry Letters and Reviews, Sep. 2010, pp. 209-212, vol. 3, No. 3, Taylor & Francis.
Maya, A. et al., "Further Naphthylcombretastatins. An Investigation on the Role of the Naphthalene Moiety," J. Med. Chem., 2005, pp. 556-568, vol. 48, No. 2.
McFedries, A. et al., "Methods for the Elucidation of Protein-Small Molecule Interactions," Chem. Biol., May 23, 2013, pp. 667-673, vol. 20, No. 5.
Mekouar, K. et al., "Styrylquinoline Derivatives: A New Class of Potent HIV-1 Integrase Inhibitors That Block HIV-1 Replication in CEM Cells," J. Med. Chem., Jan. 21, 1998, pp. 2846-2857, vol. 41, No. 15.
Mikstacka, R. et al., "Tubulin-Interactive Stilbene Derivatives as Anticancer Agents," Cell. Mol. Biol. Lett., 2013, pp. 368-397, vol. 18.
Nguyen, T. et al., "Synthesis and biological evaluation of novel heterocyclic derivatives of combretastatin A-4," Bioorg. Med. Chem. Lett., Sep. 24, 2012, pp. 7227-7231, vol. 22, No. 23.
Nguyen, T. et al., "Synthesis of (Z) isomers of benzoheterocyclic derivatives of combretastatin A-4: a comparative study of several methods," Tetrahedron, Jan. 9, 2013, pp. 2336-2347, vol. 69, No. 10, Elsevier Science Publishers, Amsterdam, Netherlands.
Notice of Allowance dated Dec. 1, 2016 from related U.S. Appl. No. 14/651,113; 5 pgs.
Notice of Allowance dated Aug. 3, 2017 from related U.S. Appl. No. 14/785,381; 5 pgs.
Notice of Allowance dated Sep. 20, 2017 from related U.S. Appl. No. 14/785,381; 4 pgs.
Notice of Allowance dated Dec. 1, 2017 from related U.S. Appl. No. 15/282,312; 5 pgs.
Notice of Allowance dated Jun. 6, 2018 from related U.S. Appl. No. 15/849,150; 7 pgs.
Notice of Allowance dated Nov. 9, 2018 from related U.S. Appl. No. 15/909,229; 14 pgs.
Odlo, K. et al., "1,5-Disubstituted 1,2,3-triazoles as cis-restricted analogues of combretastatin A-4: Synthesis, molecular modeling and evaluation as cytotoxic agents and inhibitors of tubulin," Bioorg. Med. Chem., May 1, 2008, pp. 4829-4838, vol. 16, No. 9, Pergamon, Great Britain.
Office Action dated Jun. 3, 2016 from related U.S. Appl. No. 14/651,113; 9 pgs.
Office Action dated Feb. 14, 2017 from related U.S. Appl. No. 14/785,381; 7 pgs.
Office Action dated Feb. 8, 2016 from related U.S. Appl. No. 14/785,381; 12 pgs.
Office Action dated May 20, 2016 from related U.S. Appl. No. 14/785,381; 11 pgs.
Office Action dated Oct. 31, 2016 from related U.S. Appl. No. 14/785,381; 9 pgs.
Office Action dated Jul. 6, 2016 from related Canadian Patent Application No. 2,910,063; 4 pgs.
Office Action dated Nov. 17, 2016 from related U.S. Appl. No. 14/786,331; 15 pgs.
Office Action dated May 9, 2017 from related U.S. Appl. No. 15/282,312; 14 pgs.
Office Action dated Feb. 2, 2018 from related U.S. Appl. No. 15/849,150; 9 pgs.
Office Action dated Aug. 13, 2018 from related European Patent Application No. 15773146.4; 4 pgs.
Office Action dated Jul. 11, 2019 from related Australian Patent Application No. 2015240880; 8 pgs.
Office Action dated Jan. 6, 2020 from related Australian Patent Application No. 2015240880; 4 pgs.
Ohsumi, K. et al., "Syntheses and Antitumor Activity of Cis-Restricted Combretastatins: 5-Membered Heterocyclic Analogues," Bioorg. Med. Chem. Lett., Nov. 17, 1998, pp. 3153-3158, vol. 8, No. 22, Pergamon, Netherlands.
Ohsumi, K. et al., "Novel Combretastatin Analogues Effective against Murine Solid Tumors: Design and Structure-Activity Relationships," J. Med. Chem., Sep. 7, 1998, pp. 3022-3032, vol. 41, No. 16.
Oliva, C. et al., "N-Substituted-1,2,3-triazoles: synthesis, characterization and evaluation as cannabinoid ligands," Arkivoc, 2010, pp. 127-147, vol. (ii), Arkat USA, Inc.
Papudippu, M. et al., "Regioselective synthesis and cannabinoid receptor binding affinity of N-alkylated 4,5-diaryl-1,2,3-triazoles," Med. Chem. Res., Feb. 22, 2012, pp. 4473-4484, vol. 21, No. 12, Springer Science+Business Media, LLC.
Penthala, N. et al., "Synthesis and In Vitro Screening of Novel Heterocyclic Compounds as Potential Breast Cancer Agents," Breast Cancer—Current and Alternative Therapeutic Modalities, Prof. Esra Gunduz (Ed.), Nov. 2011, Chapter 14, pp. 283-294, ISBN: 978-953-307-776-5, InTech.
Penthala, N. et al., "(Z)-3-(1H-indol-3-yl)-2-(3,4,5-trimethoxyphenyl)acrylonitrile," Acta Crystallographica Section E, Feb. 17, 2012, p. o729, vol. E68, with Supporting Information, pp. sup1-sup7.
Penthala, N. et al., "5-((1-Aroyl-1H-indol-3-yl)methylene)-2-thioxodihydropyrimidine-4,6(1H,5H)-diones as potential anticancer agents with anti-inflammatory properties," NIH Public Access, Author Manuscript, Sep. 18, 2014, pp. 1-14, published in final edited form as: Bioorg. Med. Chem. Lett., Mar. 1, 2013, pp. 1442-1446, vol. 23, No. 5.
Penthala, N. et al., "Synthesis and evaluation of a series of benzothiopene acrylonitrile analogs as anticancer agents," NIH Public Access Author Manuscript, Jul. 1, 2014, pp. 1-18; published in final edited form as: MedChemComm., Jul. 1, 2013, pp. 1073-1078, vol. 4, No. 7.
Perez-Melero, C. et al., "A new family of quinolone and quinoxaline analogues of combretastatins," Bioorg. Med. Chem. Lett., May 25, 2004, pp. 3771-3774, vol. 14, Elsevier Ltd.

(56) References Cited

OTHER PUBLICATIONS

Pubchem, Compound Summary for CID 631500, "4,5-diphenyltriazole," Mar. 28, 2005, 4 pgs.

Reddy, Y. et al., "Novel substituted (Z)-5-((N-benzyl-1H-indol-3-yl)methylene)imidazolidine-2,4-diones and 5-((N-benzyl-1H-indol-3-yl)methylene)pyrimdine-2,4,6(1H,3H,5H)-triones as potent radiosensitizing agents," Bioorg. Med. Chem. Lett., Jan. 15, 2010, pp. 600-602, vol. 20, No. 2, Elsevier Ltd.

Romagnoli, R. et al., "Synthesis and Antitumor Activity of 1,5-Disubstituted 1,2,4-Triazoles as Cis-Restricted Combretastatin Analogues," NIH Public Access Author Manuscript, May 27, 2011, pp. 1-27, published in final edited form as: J. Med. Chem., May 27, 2010, pp. 4248-4258, vol. 53, No. 10.

Saczewski, F. et al., "Synthesis, X-ray Crystal Structures, Stabilities, and in Vitro Cytotoxic Activities of New Heteroarylacrylonitriles," J. Med. Chem., 2004, pp. 3438-3449, vol. 47, No. 13.

Sekhar, K. et al., "The novel chemical entity YTR107 inhibits recruitment of nucleophosmin to sites of DNA damage, suppressing repair of DNA double strand breaks, and enhancing radiosensitization," NIH Public Access Author Manuscript, Oct. 15, 2012, pp. 1-18, published in final edited form as: Clin. Cancer Res., Oct. 15, 2011, pp. 6490-6499, vol. 17, No. 20.

Shaveta, P. et al., "Structural optimization of indole based compounds for highly promising anti-cancer activities: Structure activity relationship studies and identification of lead molecules," European Journal of Medicinal Chemistry, Jan. 8, 2014, pp. 440-450, vol. 74.

Singh, P. et al., "Design, synthesis and anticancer activities of hybrids of indole and barbituric acids—Identification of highly promising leads," Bioorg. Med. Chem. Lett., Apr. 9, 2009, pp. 3054-3058, vol. 19, No. 11, Elsevier, Ltd.

Solberg, N. et al., "Optical and SPION-Enhanced MR Imaging Shows that trans-Stilbene Inhibitors of NF-kB Concomitantly Lower Alzheimer's Disease Plaque Formation and Microglial Activation in AbetaPP/PS-1 Transgenic Mouse Brain," HHS Public Access Author Manuscript, Apr. 23, 2015, pp. 1-41, published in final edited form as: J. Alzheimers Dis., 2014, pp. 191-212, vol. 40, No. 1.

Sonar, V. et al., "(E)-3-(Benzo[b]thiophen-2-yl)-2-(3,4,5-trimethoxyphenyl)acrylonitrile and (Z)-3-(benzo[b]thiophen-2-(I)-2-(3,4-dimethoxyphenyl)acrylonitrile," Acta Crystallographica Section C, Nov. 24, 2007, pp. 0743-0745, vol. C63.

Supplementary Partial Search Report dated Oct. 6, 2016 from related European Patent Application No. 14785256.0; 8 pgs.

Tome, A. (Ed.), "Product class 13: 1,2,3-triazoles," Science of Synthesis: Hetarenes and Related Ring Systems Five-Membered Hatarenes with Three or More Heteroat; Methods of Molecular Transformations, Jan. 1, 2004, pp. 415-601, vol. 13, Category 2, Stuttgart, Georg Thieme Verlag, Germany.

Wang, X-J. et al., "General Solution to the Synthesis of N-2-Substituted 1,2,3-Triazoles," Org. Lett., Oct. 15, 2010, pp. 4632-4635, vol. 12, No. 20.

Wermuth, "The Practice of Medicinal Chemistry," 2d. Ed., 2003, Chapters 9-10, pp. 131-157, Elsevier.

\* cited by examiner

METHODS OF PROTECTING AGAINST NEURODEGENERATION

CROSS REFERENCE TO RELATED APPLICATIONS

This application claims the benefit of International application number PCT/US2018/016697, filed Feb. 2, 2018, which claims the benefit of U.S. Provisional Application No. 62/453,886, filed Feb. 2, 2017, the disclosures of which are hereby incorporated by reference in their entirety.

GOVERNMENTAL RIGHTS

This invention was made with government support under P01 AG012411-17A1 awarded by the National Institutes of Health. The government has certain rights in the invention.

FIELD OF THE INVENTION

The disclosure provides a method of preventing or reducing protein aggregates using combretastatin-A4 (CA4) or an analog thereof. The CA4 analog may bind glial fibrillary acidic protein (GFAP).

BACKGROUND OF THE INVENTION

Developing effective treatments for neurodegenerative diseases is one of the greatest medical challenges of the 21st century. Although many of these clinical entities have been recognized for more than a hundred years, it is only during the past twenty years that the molecular events that precipitate disease have begun to be understood. Protein aggregation is a common feature of many neurodegenerative diseases, and it is assumed that the aggregation process plays a central role in pathogenesis. In this process, one molecule (monomer) of a soluble protein interacts with other monomers of the same protein to form dimers, oligomers, and polymers. Conformation changes in three-dimensional structure of the protein, especially the formation of beta-strands, often accompany the process. Eventually, as the size of the aggregates increases, they may precipitate as insoluble amyloid fibrils, in which the structure is stabilized by the beta-strands interacting within a beta-sheet. Extracellular fibrous amyloid deposits or intracellular inclusions containing abnormal protein fibrils characterize many neurodegenerative diseases, including Alzheimer's, Parkinson's, and Huntington's diseases, amyotrophic lateral sclerosis, frontal temporal dementia, and the human prion diseases.

Thus, there is a need in the art for ways to prevent and/or reduce protein aggregates that cause or contribute to neurodegenerative diseases.

SUMMARY OF THE INVENTION

One aspect of the present disclosure is directed to a method to prevent or reduce protein aggregates in the central nervous system of a subject. The method comprises administering to the subject a composition comprising a compound that binds glial fibrillary acidic protein (GFAP).

Another aspect of the present disclosure is directed to a method to prevent or reduce protein aggregates in the central nervous system of a subject. The method comprises administering to the subject a composition comprising a combretastatin-A4 (CA4) or an analog thereof.

In another aspect of the disclosure provides a method to prevent or reduce amyloid protein aggregates in a subject. The method comprises administering to the subject a composition comprising a combretastatin-A4 (CA4) or an analog thereof.

In another aspect of the present disclosure is directed to a method of reducing the risk of a neurodegenerative disease. The method comprises administering to a subject a composition comprising a combretastatin-A4 (CA4) or an analog thereof.

In yet another aspect of the present disclosure is directed to a method of delaying the onset of a neurodegenerative disease. The method comprises administering to a subject a composition comprising a combretastatin-A4 (CA4) or an analog thereof.

Still another aspect of the present disclosure is directed to a method to delay or slow the progression from mild cognitive impairment to a neurodegenerative disease. The method comprises administering to a subject a composition comprising a combretastatin-A4 (CA4) or an analog thereof.

Another aspect of the present disclosure is directed to a method to reverse the signs or symptoms of a neurodegenerative disease. The method comprises administering to a subject a composition comprising a combretastatin-A4 (CA4) or an analog thereof.

Other aspects and iterations of the disclosure are described in more detail below.

BRIEF DESCRIPTION OF THE FIGURES

The application file contains at least one drawing executed in color. Copies of this patent application publication with color drawing(s) will be provided by the Office upon request and payment of the necessary fee.

DETAILED DESCRIPTION OF THE INVENTION

Figure 1:
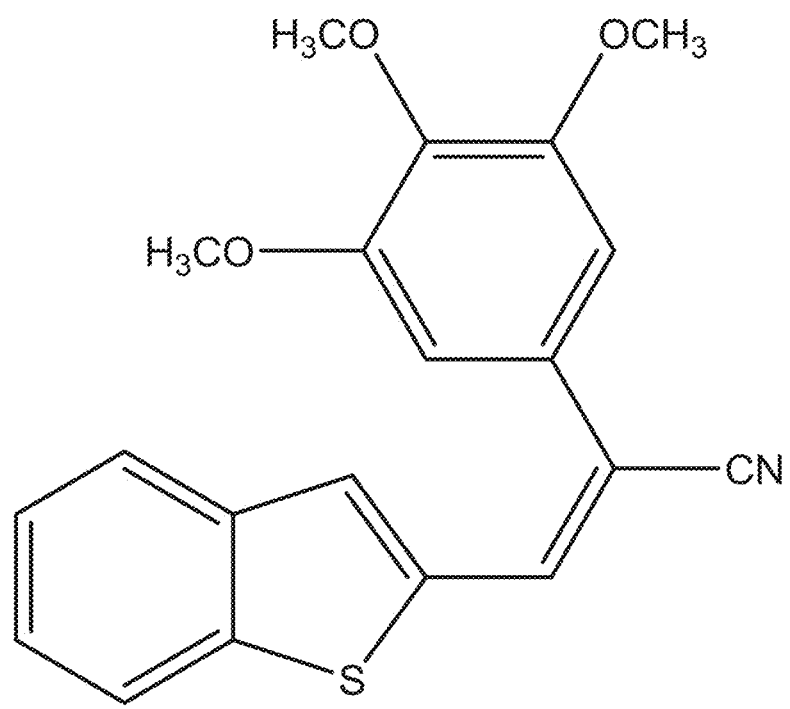
FIG. 1 depicts the structure of PNR-5-02.

Provided herein are methods and compositions preventing or reducing protein aggregates, reducing the risk, delaying the onset, delaying or slowing the progression, or reversing the signs or symptoms of a neurodegenerative disease. Suitable compositions are detailed below.

(a) Methods

One aspect of the disclosure provides a method to prevent or reduce protein aggregates in the central nervous system of a subject by administering to the subject a composition comprising a compound that binds glial fibrillary acidic protein (GFAP). Additionally, the compound may bind tubulin β chain (TUBB), myelin basic protein (MPB), histone H2B (H2B3B), and/or α-crystallin β chain (CRYAB). Aggregation-prone domains are well known in the art, or may be predicted through computational modeling. An aggregation-prone domain may be a polyglutamine tract (e.g., a polyglutamine-array expansion protein).

Protein aggregates in the central nervous system (and their related disorders) may include, but are not limited to, polyglutamine array expansion proteins such as HTT (Huntingtin, a protein that initiates aggregates in Huntington's disease), androgen receptor (AR; implicated in spinobulbar muscular atrophy), ATN1 (Atrophin 1, dentatorubral pallidoluysian atrophy), ATXN1 (Spinocerebellar ataxia Type 1), ATXN2 (Ataxin 2, Spinocerebellar ataxia type 2), ATXN3 (Ataxin 3, Spinocerebellar ataxia type 3), CACNA1A (Calcium Voltage-Gated Channel subunit Alpha1 A, Spinocerebellar ataxia type 6), ATXN7 (Ataxin 7, Spinocerebellar ataxia type 7), TBP (TATA-box Binding Protein, Spinocerebellar ataxia type 17), and non-polyglutamine array expansion proteins such as tau, α-synuclein, superoxide dismutase (SOD1), PABPN1, amyloid beta peptide, serpin, transthyretin, TDP-43 (TARDBP), valosin-containing peptide (VCP), hnRNPA2B1 and hnRNPA1 and prion protein.

Another aspect of the disclosure provides a method to prevent or reduce amyloid protein aggregates in a subject.

Exemplary disorders that have clinical signs or symptoms associated with tau aggregation include, but are not limited to, progressive supranuclear palsy, dementia pugilistica (chronic traumatic encephalopathy), frontotemporal dementia and parkinsonism linked to chromosome 17, Lytico-Bodig disease (Parkinson-dementia complex of Guam), tangle-predominant dementia, ganglioglioma and gangliocytoma, meningioangiomatosis, subacute sclerosing panencephalitis, lead encephalopathy, tuberous sclerosis, Hallervorden-Spatz disease, lipofuscinosis, Pick's disease, corticobasal degeneration, argyrophilic grain disease (AGD), Frontotemporal lobar degeneration, Alzheimer's Disease, and frontotemporal dementia.

Exemplary diseases that have symptoms associated with α-synuclein aggregation may include Parkinson's disease, Alzheimer's disease, Lewy body disease, and other neurodegenerative diseases.

Exemplary diseases that have symptoms associated with SOD1 aggregation may include ALS (amyotrophic lateral sclerosis, or Lou Gehrig's disease).

Exemplary disorders that have symptoms associated with PABPN1 aggregation may include oculopharyngeal muscular dystrophy.

Exemplary diseases that have symptoms associated with amyloid beta peptide aggregation may include Alzheimer's disease, Lewy body disease, cerebral amyloid angiopathy, inclusion body myositis, and traumatic brain injury.

Exemplary diseases that have symptoms associated with serpin aggregation ("serpinopathies") may include alpha 1-antitrypsin deficiency which may cause familial emphysema and liver cirrhosis, certain familial forms of thrombosis related to antithrombin deficiency, types 1 and 2 hereditary angioedema related to deficiency of C1-inhibitor, and familial encephalopathy with neuroserpin inclusion bodies.

Exemplary diseases that have symptoms associated with transthyretin aggregation may include senile systemic amyloidosis, familial amyloid polyneuropathy, and familial amyloid cardiomyopathy. Exemplary diseases that have symptoms associated with TDP-43 aggregation may include FTLD-TDP and chronic traumatic encephalopathy.

Exemplary diseases that are associated with VCP aggregation include Inclusion body myopathy with early-onset Paget disease and frontotemporal dementia (IBMPFD).

Exemplary diseases caused by hnRNPA2B1 and hnRNPA1 include multisystem proteinopathy, Inclusion Body Myopathy, amyotropic lateral sclerosis (ALS), and other dementias.

Exemplary diseases that have symptoms associated with prion aggregation may include scrapie, bovine spongiform encephalopathy (mad cow disease), transmissible mink encephalopathy, chronic wasting disease, feline spongiform encephalopathy, exotic ungulate encephalopathy, Creutzfeldt-Jakob diseases, Gerstmann-Straussler-Scheinker syndrome, fatal familial insomnia, and Kuru.

In an exemplary embodiment, the protein aggregates in the central nervous system may contain or are initiated by Aβ$_{1-42}$, β-amyloid, α-synuclein, and/or a polyglutamine array expansion protein. The compound may be combretastatin-A4 (CA4) or an analog thereof. The compound may reduce the number and/or total quantity of protein aggregates (see FIG. 2A and FIG. 2B). Alternatively, the reduction in protein aggregates may be evaluated using p-value. Accordingly, administration of the compound of the disclosure may be considered to reduce protein aggregates significantly when the p-value is less than 0.05, less than 0.01, less than 0.005, or less than 0.001 when compared to baseline.

In another aspect, the disclosure provides a method to prevent or reduce protein aggregates in the central nervous system of a subject. The method comprises administering to the subject a composition comprising combretastatin-A4 (CA4) or an analog thereof. Protein aggregates in the central nervous system can be the cause of neurodegenerative diseases.

Non-limiting examples of diseases, chiefly neurodegenerative, associated with protein aggregation include, but are not limited to, Huntington's disease, spinobulbar muscular atrophy, dentatorubropallidoluysian atrophy, Spinocerebellar ataxia Type 1, Spinocerebellar ataxia Type 2, Spinocerebellar ataxia Type 3, Spinocerebellar ataxia Type 6, Spinocerebellar ataxia Type 7, Spinocerebellar ataxia Type 17, progressive supranuclear palsy, dementia pugilistica (chronic traumatic encephalopathy), frontotemporal dementia and parkinsonism linked to chromosome 17, Lytico-Bodig disease (Parkinson-dementia complex of Guam), tangle-predominant dementia, ganglioglioma and gangliocytoma, meningioangiomatosis, subacute sclerosing panencephalitis, lead encephalopathy, tuberous sclerosis, Hallervorden-Spatz disease, lipofuscinosis, Pick's disease, corticobasal degeneration, argyrophilic grain disease (AGD), frontotemporal lobar degeneration, Alzheimer's disease, frontotemporal dementia, Parkinson's disease, Lewy body disease, amyotrophic lateral sclerosis (Lou Gehrig disease), oculopharyngeal muscular dystrophy, cerebral amyloid angiopathy, inclusion body myositis, traumatic brain injury, alpha 1-antitrypsin deficiency which may cause familial emphysema and liver cirrhosis, certain familial forms of thrombosis related to antithrombin deficiency, types 1 and 2 hereditary angioedema related to deficiency of C1-inhibitor, familial encephalopathy with neuroserpin inclusion bodies, senile systemic amyloidosis, familial amyloid polyneuropathy, familial amyloid cardiomyopathy, FTLD-TDP, chronic traumatic encephalopathy, inclusion body myopathy with early-onset Paget disease and frontotemporal dementia (IBMPFD), multisystem proteinopathy, scrapie, bovine spongiform encephalopathy (mad cow disease), transmissible mink encephalopathy, chronic wasting disease, feline spongiform encephalopathy, exotic ungulate encephalopathy, Creutzfeldt-Jakob diseases, Gerstmann-Straussler-Scheinker syndrome, fatal familial insomnia, and Kuru.

In a specific embodiment, the protein aggregates in the central nervous system cause Alzheimer's disease, Parkinson's disease, or Huntington's disease. In certain embodiments, the disclosure provides a method to prevent or reduce aggregates that contain or are initiated by $A\beta_{1-42}$, β-amyloid, α-synuclein, and/or a polyglutamine array expansion protein in the central nervous system of a subject.

The combretastatin-A4 (CA4) or an analog thereof may reduce the number and/or total quantity of protein aggregates by at least about 1.2-fold, at least about 1.5-fold, at least about 2-fold, at least about 2.5-fold, at least about 3-fold, at least about 3.5-fold, at least about 4-fold, at least about 4.5-fold, at least about 5-fold, at least about 5.5-fold, at least about 6-fold, at least about 6.5-fold, at least about 7-fold, at least about 7.5-fold, at least about 8-fold, at least about 8.5-fold, at least about 9-fold, at least about 9.5-fold, at least about 10-fold, at least about 11-fold, at least about 12-fold, at least about 13-fold, at least about 14-fold, at least about 15-fold, or at least about 20-fold relative to baseline. In certain embodiments, CA4 or an analog thereof may reduce the number and/or total quantity of protein aggregates by at least 1.2-fold, at least 1.5-fold, at least 2-fold, or at least 2.5-fold relative to baseline. Alternatively, the reduction in protein aggregates may be evaluated using p-value. Accordingly, administration of CA4 or an analog thereof may be considered to reduce protein aggregates significantly when the p-value is less than 0.05, less than 0.01, less than 0.005, or less than 0.001 when compared to baseline.

In still another aspect, the disclosure provides a method of reducing the risk of a neurodegenerative disease. The method comprises administering to a subject a composition comprising combretastatin-A4 (CA4) or an analog thereof. The disclosure also provides a method of delaying the onset of a neurodegenerative disease. The method comprises administering to a subject a composition comprising combretastatin-A4 (CA4) or an analog thereof.

Additionally, the disclosure provides a method to delay or slow the progression from mild cognitive impairment to a neurodegenerative disease. The method comprises administering to a subject a composition comprising combretastatin-A4 (CA4) or an analog thereof. Further, the disclosure provides a method to reverse the signs or symptoms of a neurodegenerative disease. The method comprises administering to a subject a composition comprising combretastatin-A4 (CA4) or an analog thereof. In any of the foregoing embodiments, the neurodegenerative disease is selected from the group consisting of Alzheimer's disease, Parkinson's disease, and Huntington's disease.

Suitable subjects may include a human, a livestock animal, a companion animal, a lab animal, or a zoological animal. In one embodiment, a subject may be a rodent, e.g. a mouse, a rat, a guinea pig, etc. In another embodiment, a subject may be a livestock animal. Non-limiting examples of suitable livestock animals may include pigs, cows, horses, goats, sheep, llamas, and alpacas. In yet another embodiment, a subject may be a companion animal. Non-limiting examples of companion animals may include pets such as dogs, cats, rabbits, and birds. In yet another embodiment, a subject may be a zoological animal. As used herein, a "zoological animal" refers to an animal that may be found in a zoo. Such animals may include non-human primates, large cats, wolves, and bears. In a preferred embodiment, a subject is human.

In some embodiments, a subject may have no symptoms of protein aggregation. In other embodiments, a subject may have mild cognitive impairment, dementia, or other symptoms of protein aggregation. In different embodiments, a subject may be diagnosed with a disease associated with protein aggregation. A subject may be diagnosed with a disease associated with protein aggregation by detecting the present of protein aggregates. For example, immunohistochemical methods may be used to detect protein aggregates post-mortem, or "functional imaging" methods such as fCT (functional computer-assisted tomography) or fMRI (functional magnetic resonance imaging) may be employed to diagnose neurodegenerative diseases in living individuals. In still other embodiments, a subject may be at risk for disease associated with protein aggregation. Non-limiting examples of factors increasing a subject's risk of a disease associated with protein aggregation include family history of such diseases; traumatic brain injury; recurrent head trauma; and/or Down Syndrome, or partial trisomy of chromosome 21 which might constitute a mild form of Down Syndrome.

Accordingly, in an aspect, the disclosure provides a method of reducing the risk of a neurodegenerative disease disclosed herein in a subject identified as being at risk of developing a neurodegenerative disease. The method comprises administering to the subject a composition comprising combretastatin-A4 (CA4) or an analog thereof. The disclosure also provides a method of delaying the onset of a neurodegenerative disease in a subject identified as being at risk of developing a neurodegenerative disease. The method comprises administering to the subject a composition comprising combretastatin-A4 (CA4) or an analog thereof.

Additionally, the disclosure provides a method to delay or slow the progression from mild cognitive impairment to a neurodegenerative disease in a subject identified as being at risk of developing a neurodegenerative disease. The method comprises administering to the subject a composition comprising combretastatin-A4 (CA4) or an analog thereof.

Further, the disclosure provides a method to reverse the signs or symptoms of a neurodegenerative disease in a subject identified as being at risk of developing a neurodegenerative disease. The method comprises administering to the subject a composition comprising combretastatin-A4 (CA4) or an analog thereof. In any of the foregoing embodiments, the neurodegenerative disease is selected from the group consisting of Alzheimer's disease, Parkinson's disease, and Huntington's disease.

Exemplary diseases that have symptoms associated with protein aggregation are described above, and methods for diagnosing such diseases are known in the art. Exemplary symptoms associated with protein aggregation may include impaired cognitive function, altered behavior, emotional dysregulation, seizures, epilepsy, and impaired nervous system structure or function. Impaired cognitive function includes but is not limited to difficulties with memory, attention, concentration, language, abstract thought, creativity, executive function, planning, and organization. Altered behavior includes but is not limited to physical or verbal aggression, impulsivity, decreased inhibition, apathy, decreased initiation, changes in personality, abuse of alcohol, tobacco or drugs, and other addiction-related behaviors. Emotional dysregulation includes but is not limited to depression, anxiety, mania, irritability, and emotional incontinence. Seizures include but are not limited to generalized tonic-clonic seizures, complex partial seizures, and non-epileptic, psychogenic seizures. Impaired nervous system structure or function includes but is not limited to hydrocephalus, Parkinsonism, sleep disorders, psychosis, impairment of balance and coordination. This includes motor impairments such as monoparesis, hemiparesis, tetraparesis, ataxia, ballismus, and tremor. This also includes sensory loss or dysfunction including olfactory, tactile, gustatory, visual, and auditory sensation. Furthermore, this includes autonomic nervous system impairments such as bowel and bladder dysfunction, sexual dysfunction, blood pressure and temperature dysregulation. Finally, this includes hormonal impairments attributable to dysfunction of the hypothalamus and pituitary gland such as deficiencies and dysregulation of growth hormone, thyroid stimulating hormone, lutenizing hormone, follicle stimulating hormone, gonadotropin releasing hormone, prolactin, and numerous other hormones and modulators.

In some embodiments, a symptom associated with protein aggregation refers to dementia. Dementia is not itself a specific disease, but is an overall term that describes a wide range of symptoms associated with a decline in memory or other thinking skills severe enough to reduce a person's ability to perform everyday activities. Dementia is also a shared clinical feature of many diseases associated with protein aggregation. A skilled practitioner will be familiar with the numerous methods available to diagnose the severity of dementia. For example, several cognitive tests and screening questionnaires for dementia are known in the art, all with varying degrees of sensitivity and specificity. Non-limiting examples include the mini mental state examination (MMSE), the abbreviated mental test score (AMTS), the modified mini mental state exam (3MS), the cognitive abilities screening instrument (CASI), the Trail-making test, the clock drawing test, the Informant Questionnaire on cognitive decline in the elderly, the General practitioner assessment of cognition, the Clinical Dementia Rating (CDR), Eight-item informant interview to differentiate aging, and dementia (AD8).

In a different aspect, the disclosure provides a method to reduce the risk, delay the onset and/or delay the progression of other diseases and disease-predisposing conditions that feature protein aggregation and/or aggregation-associated inflammation, including but not limited to: diabetes, insulin resistance, cardiovascular disease, hypertension, peripheral artery disease, kidney disease or insufficiency, sarcopenia, cachexia, age-associated muscle loss, rheumatism, rheumatoid arthritis, and osteoarthritis. The method comprises administering to a subject a composition comprising combretastatin-A4 (CA4) or an analog thereof.

In another different aspect, the disclosure provides a method to detect protein aggregates in a biological sample, the method comprises contacting a compound that binds GFAP with the biological sample and detecting binding of the compound to GFAP, wherein binding of the compound to GFAP indicates the presence of protein aggregates. In certain embodiment, the compound that binds GFAP is CA4 or an analog thereof.

Non-limiting examples of biological samples may include tissue samples or bodily fluids. In some embodiments, a biological sample is a tissue sample such as a tissue biopsy. The tissue biopsy may be a brain biopsy, a spinal cord biopsy, a muscle biopsy, or a CNS microvascular biopsy. The biopsied tissue may be fixed, embedded in paraffin or plastic, and sectioned, or the biopsied tissue may be frozen and cryosectioned. Alternatively, a biopsied tissue may be processed into individual cells or an explant, or processed into a homogenate, a cell extract, or a membranous fraction. A sample may also be primary and/or transformed cell cultures derived from tissue from a subject.

In other embodiments, a sample may be a bodily fluid. The fluid may be used "as is," the cellular components may be isolated from the fluid, or a protein faction may be isolated from the fluid using standard techniques. Non-limiting examples of bodily fluids include cerebrospinal fluid, interstitial fluid, blood, serum, plasma, saliva, sputum, semen, tears, and urine. For example, a sample of cerebrospinal fluid may be fractionated into individual cellular components using techniques that are well known to those with skill in the art. In preferred embodiments, a sample may be cerebrospinal fluid, blood, plasma, or serum.

In certain embodiments, the compound is labeled such that it emits a detectable signal. Non-limiting examples of suitable labels include luminescent molecules, chemiluminescent molecules, fluorochromes, fluorescent quenching agents, colored molecules, radioisotopes, scintillants, biotin, avidin, streptavidin, protein A, protein G, antibodies or fragments thereof, polyhistidine, $Ni^{2+}$, Flag tags, myc tags, heavy metals, and enzymes (including alkaline phosphatase, peroxidase, glucose oxidase, and luciferase). The detectable signal is then measured. The measurement may be qualitative, semi-quantitative, or quantitative. Detection systems to detect and optionally quantify a detectable signal (e.g. fluorescence or bioluminescence) are well known in the art. Non-limiting examples of suitable fluorescence detection systems include spectrofluorometers and microplate readers, fluorescence microscopes, fluorescence scanners, and flow cytometers. Suitable bioluminescent detection systems are also well known in the art. For instance, CCD cameras are typically used to detect and quantify the conversion of the bioluminescent substrate into light and can be equipped to devices including, but not limited to, microscopes, scanners, and microplate readers.

(b) Composition

In an aspect, the disclosure provides a composition comprising a compound that binds glial fibrillary acidic protein (GFAP). Additionally, the compound may bind tubulin β chain (TUBB), myelin basic protein (MPB), histone H2B (H2B3B), and/or α-crystallin B chain (CRYAB). Methods of determining if a compound binds GFAP and, optionally, TUBB, MPB, H2B3B and/or CRYAB are known in the art. For example, affinity-based identification such as Biacore may be used. For more methods see McFedries et al., *Chemistry & Biology* 2013; 20(5): 667-673, the disclosure of which is hereby incorporated by reference in its entirety.

In another aspect, the disclosure provides a composition comprising a combretastatin-A4 (CA4) or an analog thereof. CA4 is a combretastatin and a stillbenoid and can be isolated from *Combretum caffrum*, the Eastern Cape South African bushwillow tree, or from *Combretum leprosum*, the mofumbo, a species found in Brazil.

The combretastatin-A4 (CA4) or an analog thereof may be a compound of Formula (I):

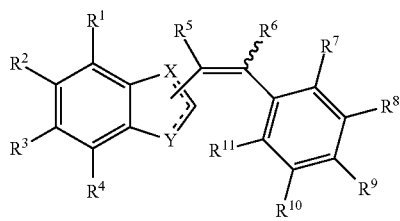

wherein $R^1$, $R^2$, $R^3$, $R^4$, $R^7$, $R^8$, $R^9$, $R^{10}$, and $R^{11}$ may be independently selected from hydrogen, halogen, hydrocarbyl, substituted hydrocarbyl, alkylalkylamino, amidine, amino, carboxyl, cyano, ester, halogen, hydroxyl, and nitro;

$R^5$ and $R^6$ may be independently selected from hydrogen, hydrocarbyl, substituted hydrocarbyl, carboxyl, ester, cyano, and taken together form furan, thiophene, pyrrole, pyrroline, pyrrolidone, thiazole, imidazole, pyrazole, oxazole, thiazole, triazole, isoxazole, and isothiazole;

X and Y may be independently selected from O, C, $CR^{12}$, $CR^{12}R^{13}$, S, $SR^{14}N$, and $NR^{15}$;

$R^{12}$, $R^{13}$, $R^{14}$, and $R^{15}$ may be independently chosen from hydrogen, hydrocarbyl, substituted hydrocarbyl, alkylalkylamino, amidine, amino, carboxyl, cyano, ester, halogen, hydroxyl, and nitro; and

- - - - - may independently be a single bond that is present or absent, with the proviso that both - - - - - are not present at the same time.

$R^1$, $R^2$, $R^3$, and $R^4$ may be independently selected from hydrogen, hydrocarbyl, substituted hydrocarbyl, alkylalkylamino, amidine, amino, carboxyl, cyano, ester, halogen, hydroxyl, and nitro. Alkylalkylamino groups are disubstituted amine groups. Each of the alkyl groups may be the same or different. In one embodiment, both alkyl groups may be lower alkyl groups. The amidine nitrogen groups may be further substituted by hydrogen, hydrocarbyl, or substituted hydrocarbyl at each position. Preferably, the amidine nitrogens may each be substituted by hydrogen. Where the group is an amine, the amine may be a primary, secondary, or tertiary amine. Preferably, amine substituents may be lower alkyl groups. Ester groups may be attached to the phenyl ring at either the carbonyl end or at the oxygen end of the ester. The opposite terminus may be hydrocarbyl or substituted hydrocarbyl, and is preferably a lower alkyl group.

In one embodiment, $R^1$, $R^2$, $R^3$, and $R^4$ may be independently selected from hydrogen, hydroxyl, alkoxy, nitro, and amino. In a preferred embodiment, $R^1$ and $R^4$ may both be hydrogen. In yet another preferred embodiment, each of $R^1$, $R^2$, $R^3$, and $R^4$ may be hydrogen.

$R^7$, $R^8$, $R^9$, $R^{10}$, and $R^{11}$ may be independently selected from hydrogen, hydrocarbyl, substituted hydrocarbyl, alkylalkylamino, amidine, amino, carboxyl, cyano, ester, halogen, hydroxyl, and nitro. Alkylalkylamino groups are disubstituted amine groups. Each of the alkyl groups may be the same or different. In one embodiment, both alkyl groups may be lower alkyl groups. The amidine nitrogen groups may be further substituted by hydrogen, hydrocarbyl, or substituted hydrocarbyl at each position. Preferably, the amidine nitrogens may each be substituted by hydrogen. Where the group is an amine, the amine may be a primary, secondary, or tertiary amine. Preferably, amine substituents may be lower alkyl groups. Ester groups may be attached at either the carbonyl end or at the oxygen end of the ester. The opposite terminus of the ester may be hydrocarbyl or substituted hydrocarbyl. Preferably, the ester may be a lower alkyl ester.

In certain embodiments, $R^7$, $R^8$, $R^9$, $R^{10}$, and $R^{11}$ may be selected from hydrogen, hydroxyl, and alkoxy. In one preferred embodiment, $R^7$ and $R^{11}$ may be hydrogen.

In another embodiment, $R^8$, $R^9$, and $R^{10}$ may be independently selected from hydrogen, methoxy, ethoxy, benzyloxy, substituted benzyloxy, hydroxyl, and lower alkyl groups. In one embodiment, $R^8$, $R^9$, and $R^{10}$ may be independently selected from hydrogen, hydroxyl, and alkoxy. In one preferred embodiment, $R^8$, $R^9$, and $R^{10}$ may be methoxy and $R^7$ and $R^{11}$ may be hydrogen.

$R^5$ and $R^6$ are independently selected from hydrogen, hydrocarbyl, substituted hydrocarbyl, carboxyl, ester, and cyano. Ester groups may be attached at either the carbonyl end or at the oxygen end of the ester. The terminus of the ester that is not bound to the double bond may be hydrocarbyl or substituted hydrocarbyl. Preferably, the ester is a lower alkyl ester.

In one embodiment, $R^5$ may be hydrogen and $R^6$ may be selected from hydrogen, cyano, and carboxyl. In still another embodiment, $R^5$ may be hydrogen and $R^6$ may be cyano. In yet another exemplary embodiment, $R^5$ and $R^6$ are hydrogen.

In an embodiment, $R^5$ and $R^6$ may together form furan, thiophene, pyrrole, pyrroline, pyrrolidone, thiazole, imidazole, pyrazole, oxazole, thiazole, triazole, isoxazole, and isothiazole.

In one embodiment, $R^5$ and $R^6$ may together form pyrrole, pyrroline, pyrrolidone, thiazole, imidazole, pyrazole, oxazole, thiazole, triazole, isoxazole, and isothiazole. In an exemplary embodiment, $R^5$ and $R^6$ may together form a triazole.

X and Y may be independently selected from O, C, $CR^{12}$, $CR^{12}R^{13}$, S, $SR^{14}N$, and $NR^{15}$. In one embodiment, when X may be selected from C, $CR^{12}$, and $CR^{12}R^{13}$, then Y may not be selected from C, $CR^{12}$, and $CR^{12}R^{13}$. In another embodiment, X may be selected from C and S. In still another embodiment, Y may be selected from O, S, and $NR^{15}$. In some specific embodiments, X may be C and Y may be S, or X may be C and Y may be O, or X may be C and Y may be $NR^{15}$, or X may be S and Y may be N.

$R^{12}$, $R^{13}$, $R^{14}$, and $R^{15}$ may be independently selected from hydrogen, hydrocarbyl, substituted hydrocarbyl, alkylalkylamino, amidine, amino, carboxyl, cyano, ester, halogen, hydroxyl, and nitro. Alkylalkylamino groups are disubstituted amine groups. Each of the alkyl groups may be the same or different. In one embodiment, both alkyl groups may be lower alkyl groups. The amidine nitrogen groups may be further substituted by hydrogen, hydrocarbyl, or substituted hydrocarbyl at each position. Preferably, the amidine nitrogens may be each substituted by hydrogen. Where the group is an amine, the amine may be a primary, secondary, or tertiary amine. Preferably, amine substituents may be lower alkyl groups. Ester groups may be attached at either the carbonyl end or at the oxygen end of the ester. The terminus of the ester that is not bound to the aromatic ring may be hydrocarbyl or substituted hydrocarbyl. Preferably, the ester may be a lower alkyl ester.

In one preferred embodiment, each of $R^{12}$, $R^{13}$, $R^{14}$, and $R^{15}$ may be hydrogen. In yet another embodiment, $R^{12}$, $R^{13}$, $R^{14}$, and $R^{15}$ may comprise the formula:

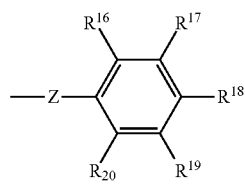

wherein

Z may be selected from $CH_2$, CO, and $SO_2$; and $R^{16}$, $R^{17}$, $R^{18}$, $R^{19}$, and $R^{20}$ may be independently selected from hydrogen, hydrocarbyl, substituted hydrocarbyl, alkylalkylamino, amidine, amino, carboxyl, cyano, ester, halogen, hydroxyl, and nitro.

In one preferred embodiment, $R^{16}$ and $R^{20}$ may be hydrogen, while $R^{17}$, $R^{18}$, and $R^{19}$ may be selected from amino, carboxyl, cyano, ester, halogen, alkyl, and hydrogen.

The stilbene or modified stilbene moiety may be bonded to the five-membered ring at any one of the non-fused ring positions. In various embodiments, the stilbene moiety may be attached through a bond to X, through a bond to Y, or a bond to the carbon atom between the X and Y atoms.

The wavy bond at $R^6$ indicates that $R^6$ may be at either geometric position on the double bond. Accordingly, the double bond may be (E) or (Z), which are defined according to the IUPAC convention. In one embodiment, the double bond may have an (E) configuration, and in another embodiment, the double bond may have a (Z) configuration.

The compound comprising Formula (I) may be a free form or a salt. When the compound is in a salt form, the salt is preferably a pharmaceutically acceptable salt. Pharmaceutically acceptable salts may include, without limitation, hydrochloride, hydrobromide, phosphate, sulfate, methanesulfonate, acetate, formate, tartaric acid, bitartrate, stearate, phthalate, hydroiodide, lactate, monohydrate, mucate, nitrate, phosphate, salicylate, phenylpropionate, isobutyrate, hypophosphite, maleic, malic, citrate, isocitrate, succinate, lactate, gluconate, glucuronate, pyruvate, oxalate, fumarate, propionate, aspartate, glutamate, benzoate, terephthalate, and the like. In other embodiments, the pharmaceutically acceptable salt includes an alkaline or alkaline earth metal ion salt. In particular, sodium, potassium or other pharmaceutically acceptable inorganic salts are used. The salt forms may be amorphous or in various polymeric forms including hydrates, or solvates with alcohols or other solvents.

In one embodiment, the compound of Formula (I) may be selected from the group consisting of:

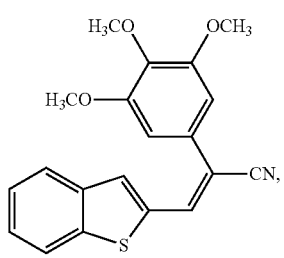
(PNR-5-02)

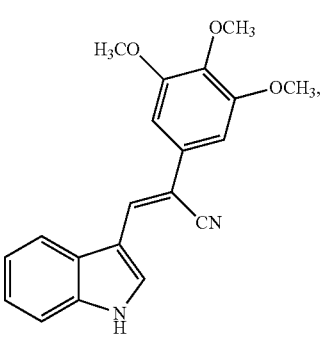
(PNR-4-43)

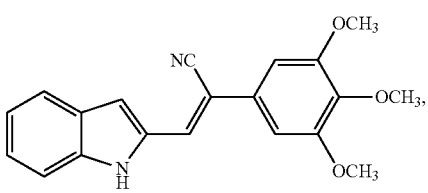
(PNR-4-44)

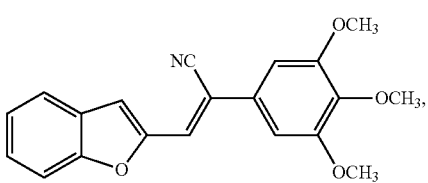
(PNR-4-48)

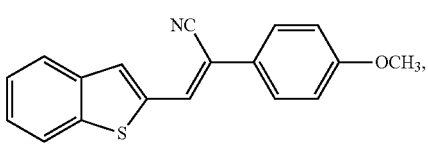
(PNR-4-76)

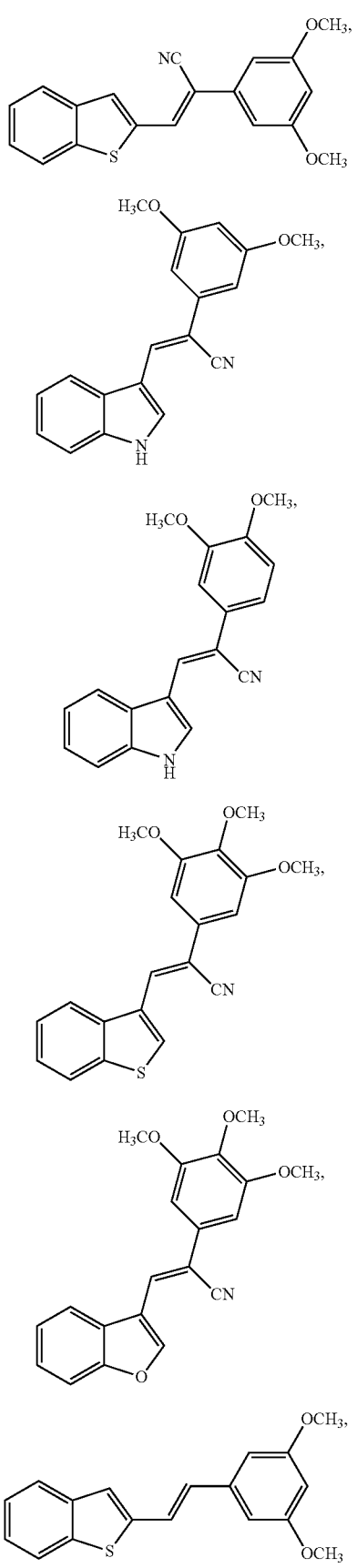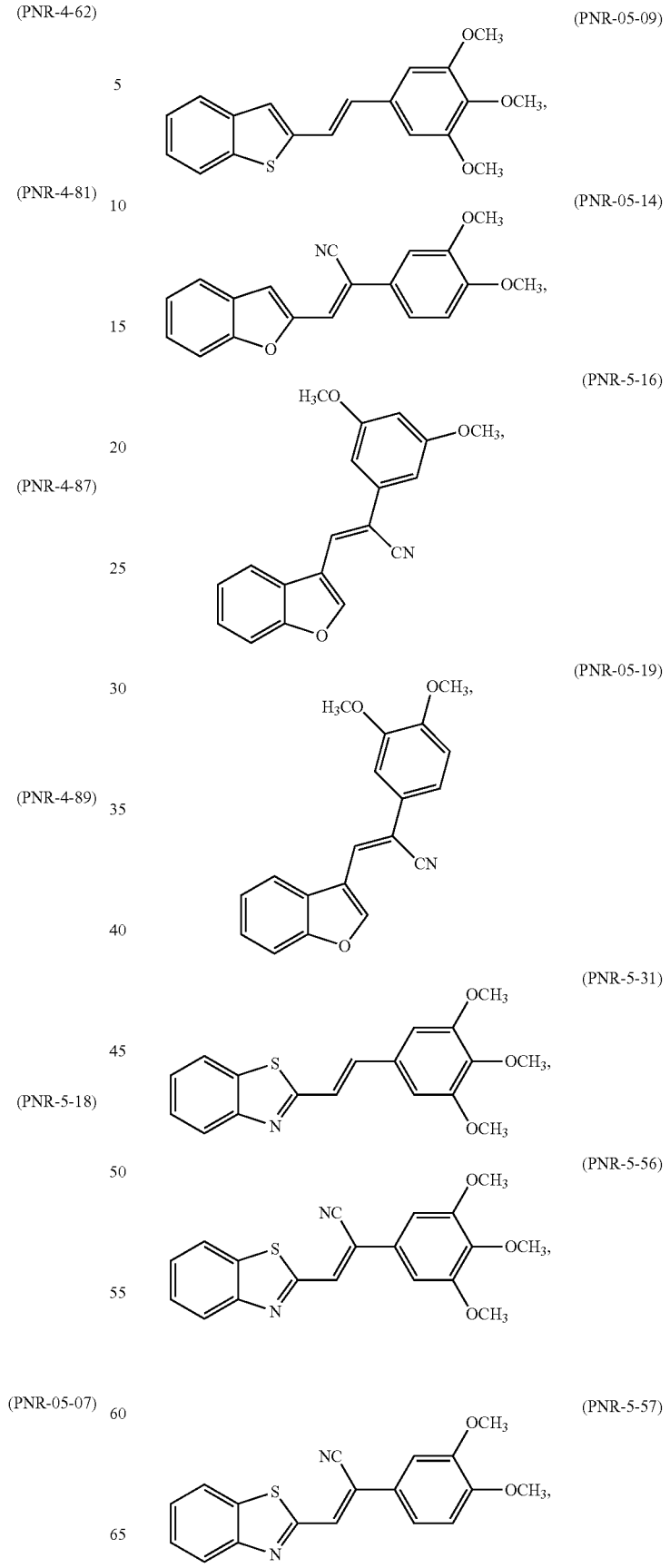

-continued
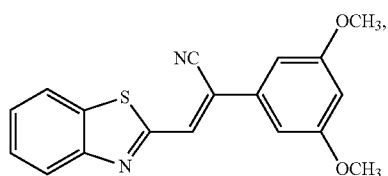
(PNR-5-58)
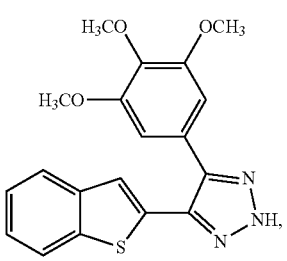
(PNR-7-74)
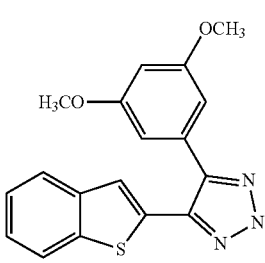
(PNR-7-83)
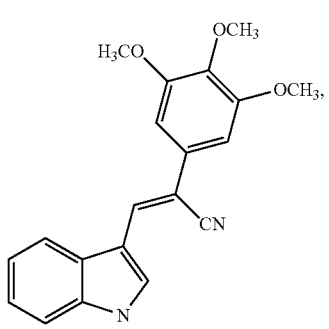
(PNR-4-43)
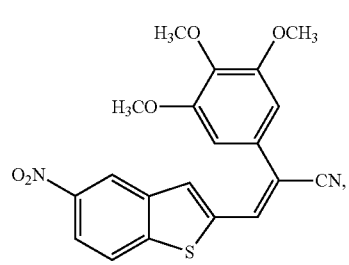
(DSS-1-120)
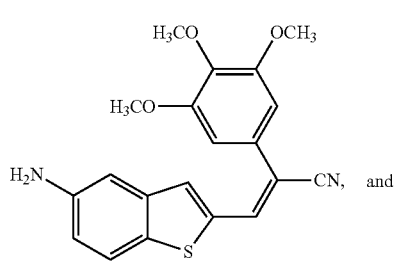
(DSS-1-121)
-continued
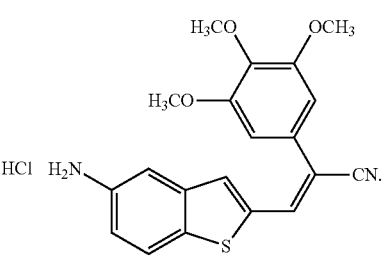
(DSS-1-122)
In an exemplary embodiment, the compound of Formula (I) may be
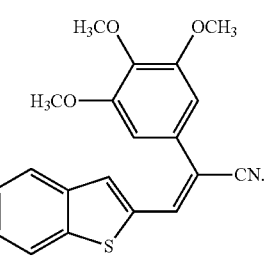
(PNR-5-02)
In an exemplary embodiment, the compound of Formula (I) may be
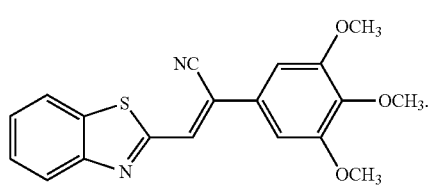
(PNR4-87)
In an exemplary embodiment, the compound of Formula (I) may be
(PNR5-56)

In an exemplary embodiment, the compound of Formula (I) may be

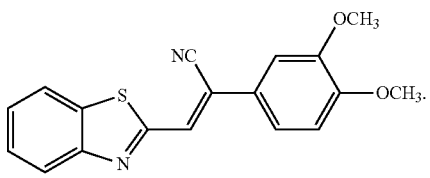

(PNR5-57)

An analog of combretastatin-A4 (CA4) may be modified to improve activity, binding affinity, bioavailability, solubility, stability, handling properties, or a combination thereof, as compared to an unmodified version. An analog of CA4 is a modified version of CA4 that is able to bind GFAP and, optionally, TUBB, MPB, H2B3B and/or CRYAB and/or reduce/prevent protein aggregates. CA4 analogs are known in the art. See for example, US 20160068506, WO 2015153635, WO 1999035150, U.S. Pat. No. 5,561,122, WO 2001081355, U.S. Pat. No. 6,743,937, US 20110124899, CN 101220054, US 20130137740, U.S. Pat. Nos. 6,855,702, 7,659,262, 4,996,237, WO 1994005682, each of which are incorporated herein in their entirety by reference.

Methods for preparing the combretastatin-A4 (CA4) or analogs thereof are generally known in the art. Methods for synthesizing the combretastatin-A4 (CA4) or analogs thereof are disclosed in US 20160068506, WO 2015153635, WO 1999035150, WO 2001081355, US 20110124899, US 20130137740, and WO 1994005682.

(i) Optional Additional Pharmaceutical Ingredients

The composition of the disclosure may optionally comprise one or more additional drug or therapeutically active agent in addition to CA4 or an analog thereof.

In an embodiment, the compound of Formula (I) may be combined with other compounds of Formula (I) or may be combined with one or more additional active pharmaceutical ingredients.

(ii) Excipient

The composition of the invention may further comprise a pharmaceutically acceptable excipient. Further, a composition of the disclosure may contain preserving agents, solubilizing agents, stabilizing agents, wetting agents, emulsifiers, sweeteners, colorants, odorants, salts (substances of the present invention may themselves be provided in the form of a pharmaceutically acceptable salt), buffers, coating agents or antioxidants.

The pharmaceutically acceptable excipient may be a diluent, a binder, a filler, a buffering agent, a pH modifying agent, a disintegrant, a dispersant, a preservative, a lubricant, a taste-masking agent, a flavoring agent, or a coloring agent. The amount and types of excipients utilized to form pharmaceutical compositions may be selected according to known principles of pharmaceutical science.

In one embodiment, the excipient may be a diluent. The diluent may be compressible (i.e., plastically deformable) or abrasively brittle. Non-limiting examples of suitable compressible diluents include microcrystalline cellulose (MCC), cellulose derivatives, cellulose powder, cellulose esters (i.e., acetate and butyrate mixed esters), ethyl cellulose, methyl cellulose, hydroxypropyl cellulose, hydroxypropyl methylcellulose, sodium carboxymethylcellulose, corn starch, phosphated (phosphorylated) corn starch, pregelatinized corn starch, rice starch, potato starch, tapioca starch, starch-lactose, starch-calcium carbonate, sodium starch glycolate, glucose, fructose, lactose, lactose monohydrate, sucrose, xylose, lactitol, mannitol, malitol, sorbitol, xylitol, maltodextrin, and trehalose. Non-limiting examples of suitable abrasively brittle diluents include dibasic calcium phosphate (anhydrous or dihydrate), calcium phosphate tribasic, calcium carbonate, and magnesium carbonate.

In another embodiment, the excipient may be a binder. Suitable binders include, but are not limited to, starches, pregelatinized starches, gelatin, polyvinylpyrrolidone, cellulose, methylcellulose, sodium carboxymethylcellulose, ethylcellulose, polyacrylamides, polyvinyloxoazolidone, polyvinylalcohols, $C_{12}$-$C_{18}$ fatty acid alcohol, polyethylene glycol, polyols, saccharides, oligosaccharides, polypeptides, oligopeptides, and combinations thereof.

In another embodiment, the excipient may be a filler. Suitable fillers include, but are not limited to, carbohydrates, inorganic compounds, and polyvinylpyrrolidone. By way of non-limiting example, the filler may be calcium sulfate, both di- and tri-basic, starch, calcium carbonate, magnesium carbonate, microcrystalline cellulose, dibasic calcium phosphate, magnesium carbonate, magnesium oxide, calcium silicate, talc, modified starches, lactose, sucrose, mannitol, or sorbitol.

In still another embodiment, the excipient may be a buffering agent. Representative examples of suitable buffering agents include, but are not limited to, phosphates, carbonates, citrates, tris buffers, and buffered saline salts (e.g., Tris buffered saline or phosphate buffered saline).

In various embodiments, the excipient may be a pH modifier. By way of non-limiting example, the pH modifying agent may be sodium carbonate, sodium bicarbonate, sodium citrate, citric acid, or phosphoric acid.

In a further embodiment, the excipient may be a disintegrant. The disintegrant may be non-effervescent or effervescent. Suitable examples of non-effervescent disintegrants include, but are not limited to, starches such as corn starch, potato starch, pregelatinized and modified starches thereof, sweeteners, clays, such as bentonite, micro-crystalline cellulose, alginates, sodium starch glycolate, gums such as agar, guar, locust bean, karaya, pecitin, and tragacanth. Non-limiting examples of suitable effervescent disintegrants include sodium bicarbonate in combination with citric acid and sodium bicarbonate in combination with tartaric acid.

In yet another embodiment, the excipient may be a dispersant or dispersing enhancing agent. Suitable dispersants may include, but are not limited to, starch, alginic acid, polyvinylpyrrolidones, guar gum, kaolin, bentonite, purified wood cellulose, sodium starch glycolate, isoamorphous silicate, and microcrystalline cellulose.

In another alternate embodiment, the excipient may be a preservative. Non-limiting examples of suitable preservatives include antioxidants, such as BHA, BHT, vitamin A, vitamin C, vitamin E, or retinyl palmitate, citric acid, sodium citrate; chelators such as EDTA or EGTA; and antimicrobials, such as parabens, chlorobutanol, or phenol.

In a further embodiment, the excipient may be a lubricant. Non-limiting examples of suitable lubricants include minerals such as talc or silica; and fats such as vegetable stearin, magnesium stearate or stearic acid.

In yet another embodiment, the excipient may be a taste-masking agent. Taste-masking materials include cellulose ethers; polyethylene glycols; polyvinyl alcohol; polyvinyl alcohol and polyethylene glycol copolymers; monoglycerides or triglycerides; acrylic polymers; mixtures of acrylic polymers with cellulose ethers; cellulose acetate phthalate; and combinations thereof.

In an alternate embodiment, the excipient may be a flavoring agent. Flavoring agents may be chosen from synthetic flavor oils and flavoring aromatics and/or natural oils, extracts from plants, leaves, flowers, fruits, and combinations thereof.

In still a further embodiment, the excipient may be a coloring agent. Suitable color additives include, but are not limited to, food, drug and cosmetic colors (FD&C), drug and cosmetic colors (D&C), or external drug and cosmetic colors (Ext. D&C).

The weight fraction of the excipient or combination of excipients in the composition may be about 99% or less, about 97% or less, about 95% or less, about 90% or less, about 85% or less, about 80% or less, about 75% or less, about 70% or less, about 65% or less, about 60% or less, about 55% or less, about 50% or less, about 45% or less, about 40% or less, about 35% or less, about 30% or less, about 25% or less, about 20% or less, about 15% or less, about 10% or less, about 5% or less, about 2%, or about 1% or less of the total weight of the composition.

(iii) Dosage Forms

The composition can be formulated into various dosage forms and administered by a number of different means that will deliver a therapeutically effective amount of the active ingredient. Such compositions can be administered orally, parenterally, or topically in dosage unit formulations containing conventional nontoxic pharmaceutically acceptable carriers, adjuvants, and vehicles as desired. Topical administration may also involve the use of transdermal administration such as transdermal patches or iontophoresis devices. The term parenteral as used herein includes subcutaneous, intravenous, intramuscular, or intrasternal injection, or infusion techniques. Formulation of drugs is discussed in, for example, Gennaro, A. R., Remington's Pharmaceutical Sciences, Mack Publishing Co., Easton, Pa. ($18^{th}$ ed, 1995), and Liberman, H. A. and Lachman, L., Eds., Pharmaceutical Dosage Forms, Marcel Dekker Inc., New York, N.Y. (1980).

Solid dosage forms for oral administration include capsules, tablets, caplets, pills, powders, pellets, and granules. In such solid dosage forms, the active ingredient is ordinarily combined with one or more pharmaceutically acceptable excipients, examples of which are detailed above. Oral preparations may also be administered as aqueous suspensions, elixirs, or syrups. For these, the active ingredient may be combined with various sweetening or flavoring agents, coloring agents, and, if so desired, emulsifying and/or suspending agents, as well as diluents such as water, ethanol, glycerin, and combinations thereof.

For parenteral administration (including subcutaneous, intradermal, intravenous, intramuscular, and intraperitoneal), the preparation may be an aqueous or an oil-based solution. Aqueous solutions may include a sterile diluent such as water, saline solution, a pharmaceutically acceptable polyol such as glycerol, propylene glycol, or other synthetic solvents; an antibacterial and/or antifungal agent such as benzyl alcohol, methyl paraben, chlorobutanol, phenol, thimerosal, and the like; an antioxidant such as ascorbic acid or sodium bisulfite; a chelating agent such as etheylenediaminetetraacetic acid; a buffer such as acetate, citrate, or phosphate; and/or an agent for the adjustment of tonicity such as sodium chloride, dextrose, or a polyalcohol such as mannitol or sorbitol. The pH of the aqueous solution may be adjusted with acids or bases such as hydrochloric acid or sodium hydroxide. Oil-based solutions or suspensions may further comprise sesame, peanut, olive oil, or mineral oil.

For topical (e.g., transdermal or transmucosal) administration, penetrants appropriate to the barrier to be permeated are generally included in the preparation. Transmucosal administration may be accomplished through the use of nasal sprays, aerosol sprays, tablets, or suppositories, and transdermal administration may be via ointments, salves, gels, patches, or creams as generally known in the art.

In certain embodiments, an active ingredient of the disclosure is encapsulated in a suitable vehicle to either aid in the delivery of the compound to target cells, to increase the stability of the composition, or to minimize potential toxicity of the composition. As will be appreciated by a skilled artisan, a variety of vehicles are suitable for delivering a composition of the present invention. Non-limiting examples of suitable structured fluid delivery systems may include nanoparticles, liposomes, microemulsions, micelles, dendrimers, and other phospholipid-containing systems. Methods of incorporating compositions into delivery vehicles are known in the art.

In one alternative embodiment, a liposome delivery vehicle may be utilized. Liposomes, depending upon the embodiment, are suitable for delivery of an active ingredient of the disclosure in view of their structural and chemical properties. Generally speaking, liposomes are spherical vesicles with a phospholipid bilayer membrane. The lipid bilayer of a liposome may fuse with other bilayers (e.g., the cell membrane), thus delivering the contents of the liposome to cells. In this manner, an active ingredient of the disclosure may be selectively delivered to a cell by encapsulation in a liposome that fuses with the targeted cell's membrane.

Liposomes may be comprised of a variety of different types of phosolipids having varying hydrocarbon chain lengths. Phospholipids generally comprise two fatty acids linked through glycerol phosphate to one of a variety of polar groups. Suitable phospholids include phosphatidic acid (PA), phosphatidylserine (PS), phosphatidylinositol (PI), phosphatidylglycerol (PG), diphosphatidylglycerol (DPG), phosphatidylcholine (PC), and phosphatidylethanolamine (PE). The fatty acid chains comprising the phospholipids may range from about 6 to about 26 carbon atoms in length, and the lipid chains may be saturated or unsaturated. Suitable fatty acid chains include (common name presented in parentheses) n-dodecanoate (laurate), n-tretradecanoate (myristate), n-hexadecanoate (palmitate), n-octadecanoate (stearate), n-eicosanoate (arachidate), n-docosanoate (behenate), n-tetracosanoate (lignocerate), cis-9-hexadecenoate (palmitoleate), cis-9-octadecanoate (oleate), cis,cis-9,12-octadecandienoate (linoleate), all cis-9,12,15-octadecatrienoate (linolenate), and all cis-5,8,11,14-eicosatetraenoate (arachidonate). The two fatty acid chains of a phospholipid may be identical or different. Acceptable phospholipids include dioleoyl PS, dioleoyl PC, distearoyl PS, distearoyl PC, dimyristoyl PS, dimyristoyl PC, dipalmitoyl PG, stearoyl, oleoyl PS, palmitoyl, linolenyl PS, and the like.

The phospholipids may come from any natural source, and, as such, may comprise a mixture of phospholipids. For example, egg yolk is rich in PC, PG, and PE, soy beans contains PC, PE, PI, and PA, and animal brain or spinal cord is enriched in PS. Phospholipids may come from synthetic sources too. Mixtures of phospholipids having a varied ratio of individual phospholipids may be used. Mixtures of different phospholipids may result in liposome compositions having advantageous activity or stability of activity properties. The above mentioned phospholipids may be mixed, in optimal ratios with cationic lipids, such as N-(1-(2,3-dioleolyoxy)propyl)-N,N,N-trimethyl ammonium chloride, 1,1'-dioctadecyl-3,3,3',3'-tetramethylindocarbocyanine perchloarate, 3,3'-deheptyloxacarbocyanine iodide, 1,1'-dedodecyl-3,3,3',3'-tetramethylindocarbocyanine perchloarate, 1,1'-dioleyl-3,3,3',3'-tetramethylindo carbocyanine methanesulfonate, N-4-(delinoleylaminostyryl)-N-methylpyridinium iodide, or 1,1,-dilinoleyl-3,3,3',3'-tetramethylindocarbocyanine perchloarate.

Liposomes may optionally comprise sphingolipids, in which spingosine is the structural counterpart of glycerol and one of the one fatty acids of a phosphoglyceride, or cholesterol, a major component of animal cell membranes. Liposomes may optionally, contain pegylated lipids, which are lipids covalently linked to polymers of polyethylene glycol (PEG). PEGs may range in size from about 500 to about 10,000 daltons.

Liposomes may further comprise a suitable solvent. The solvent may be an organic solvent or an inorganic solvent. Suitable solvents include, but are not limited to, dimethylsulfoxide (DMSO), methylpyrrolidone, N-methylpyrrolidone, acetronitrile, alcohols, dimethylformamide, tetrahydrofuran, or combinations thereof.

Liposomes carrying an active ingredient of the disclosure may be prepared by any known method of preparing liposomes for drug delivery, such as, for example, detailed in U.S. Pat. Nos. 4,241,046, 4,394,448, 4,529,561, 4,755,388, 4,828,837, 4,925,661, 4,954,345, 4,957,735, 5,043,164, 5,064,655, 5,077,211, and 5,264,618, the disclosures of which are hereby incorporated by reference in their entirety. For example, liposomes may be prepared by sonicating lipids in an aqueous solution, solvent injection, lipid hydration, reverse evaporation, or freeze drying by repeated freezing and thawing. In a preferred embodiment the liposomes are formed by sonication. The liposomes may be multilamellar, which have many layers like an onion, bilamellar, or unilamellar. The liposomes may be large or small. Continued high-shear sonication tends to form smaller unilamellar lipsomes.

As would be apparent to one of ordinary skill, all of the parameters that govern liposome formation may be varied. These parameters include, but are not limited to, temperature, pH, concentration of compound, concentration, and composition of lipid, concentration of multivalent cations, rate of mixing, presence of and concentration of solvent.

In another embodiment, an active ingredient of the disclosure may be delivered to a cell as a microemulsion. Microemulsions are generally clear, thermodynamically stable solutions comprising an aqueous solution, a surfactant, and "oil." The "oil" in this case, is the supercritical fluid phase. The surfactant rests at the oil-water interface. Any of a variety of surfactants are suitable for use in microemulsion formulations including those described herein or otherwise known in the art. The aqueous microdomains suitable for use in the invention generally will have characteristic structural dimensions from about 5 nm to about 100 nm. Aggregates of this size are poor scatterers of visible light and hence, these solutions are optically clear. As will be appreciated by a skilled artisan, microemulsions can and will have a multitude of different microscopic structures including sphere, rod, or disc shaped aggregates. In one embodiment, the structure may be micelles, which are the simplest microemulsion structures that are generally spherical or cylindrical objects. Micelles are like drops of oil in water, and reverse micelles are like drops of water in oil. In an alternative embodiment, the microemulsion structure is the lamellae. It comprises consecutive layers of water and oil separated by layers of surfactant. The "oil" of microemulsions optimally comprises phospholipids. Any of the phospholipids detailed above for liposomes are suitable for embodiments directed to microemulsions. An active ingredient of the disclosure may be encapsulated in a microemulsion by any method generally known in the art.

In yet another embodiment, an active ingredient of the disclosure may be delivered in a dendritic macromolecule, or a dendrimer. Generally speaking, a dendrimer is a branched tree-like molecule, in which each branch is an interlinked chain of molecules that divides into two new branches (molecules) after a certain length. This branching continues until the branches (molecules) become so densely packed that the canopy forms a globe. Generally, the properties of dendrimers are determined by the functional groups at their surface. For example, hydrophilic end groups, such as carboxyl groups, would typically make a water-soluble dendrimer. Alternatively, phospholipids may be incorporated in the surface of a dendrimer to facilitate absorption across the skin. Any of the phospholipids detailed for use in liposome embodiments are suitable for use in dendrimer embodiments. Any method generally known in the art may be utilized to make dendrimers and to encapsulate an active ingredient of the disclosure therein. For example, dendrimers may be produced by an iterative sequence of reaction steps, in which each additional iteration leads to a higher order dendrimer. Consequently, they have a regular, highly branched 3D structure, with nearly uniform size and shape. Furthermore, the final size of a dendrimer is typically controlled by the number of iterative steps used during synthesis. A variety of dendrimer sizes are suitable for use in the invention. Generally, the size of dendrimers may range from about 1 nm to about 100 nm.

(iv) Administration

In certain aspects, a pharmacologically effective amount of a composition of the disclosure may be administered to a subject. Administration is performed using standard effective techniques, including peripherally (i.e., not by administration into the central nervous system) or locally to the central nervous system. Peripheral administration includes but is not limited to intravenous, intraperitoneal, subcutaneous, intratumoral, pulmonary, transdermal, intramuscular, intranasal, buccal, sublingual, or suppository administration. Local administration, including directly into the central nervous system (CNS) includes but is not limited to via a lumbar, intraventricular or intraparenchymal catheter or using a surgically implanted controlled release formulation. Pheresis may be used to deliver a composition of the invention. In certain embodiments, a composition of the disclosure may be administered via an infusion (continuous or bolus).

Pharmaceutical compositions for effective administration are deliberately designed to be appropriate for the selected mode of administration, and pharmaceutically acceptable excipients such as compatible dispersing agents, buffers, surfactants, preservatives, solubilizing agents, isotonicity agents, stabilizing agents, and the like are used as appropriate. Remington's Pharmaceutical Sciences, Mack Publishing Co., Easton Pa., 16Ed ISBN: 0-912734-04-3, latest edition, incorporated herein by reference in its entirety, provides a compendium of formulation techniques as are generally known to practitioners.

Effective peripheral systemic delivery by intravenous or intraperitoneal or subcutaneous or intratumoral injection is a preferred method of administration to a living patient. Suitable vehicles for such injections are straightforward. In addition, however, administration may also be effected through the mucosal membranes by means of nasal aerosols or suppositories. Suitable formulations for such modes of administration are well known and typically include surfactants that facilitate cross-membrane transfer. Such surfactants are often derived from steroids or are cationic lipids, such as N-[1-(2,3-dioleoyl)propyl]-N,N,N-trimethyl ammonium chloride (DOTMA) or various compounds such as cholesterol hemisuccinate, phosphatidyl glycerols and the like.

For therapeutic applications, a therapeutically effective amount of a composition of the disclosure is administered to a subject. A "therapeutically effective amount" is an amount of the therapeutic composition sufficient to produce a measurable response (e.g., reduction in protein aggregates and/or signs of symptoms of protein aggregation or disease). Actual dosage levels of active ingredients in a therapeutic composition of the disclosure can be varied so as to administer an amount of the active ingredient(s) that is effective to achieve the desired therapeutic response for a particular subject. The selected dosage level will depend upon a variety of factors including the activity of the therapeutic composition, formulation, the route of administration, combination with other drugs or treatments, aggregate burden, neurodegenerative disease, and the physical condition and prior medical history of the subject being treated. In some embodiments, a minimal dose is administered, and dose is escalated in the absence of dose-limiting toxicity. Determination and adjustment of a therapeutically effective dose, as well as evaluation of when and how to make such adjustments, are known to those of ordinary skill in the art of medicine.

The frequency of dosing may be once, twice, three times or more daily or once, twice, three times or more per week or per month, as needed as to effectively treat the symptoms or disease. In certain embodiments, the frequency of dosing may be once, twice or three times daily. For example, a dose may be administered every 24 hours, every 12 hours, or every 8 hours. In other embodiments, a dose may be administered weekly. For example, a dose may be administered weekly, every 2 weeks, every 3 weeks, every 4 weeks, every 5 weeks, or every 6 weeks. In still other embodiments, a dose may be administered monthly. For example, a dose may be administered monthly, every 2 months, every 3 months, every 4 months, every 5 months, every 6 months, every 7 months, every 8 months, every 9 months, every 10 months, every 11 months, or every 12 months.

Duration of treatment could range from a single dose administered on a one-time basis to a life-long course of therapeutic treatments. The duration of treatment can and will vary depending on the subject and the disease to be treated. For example, the duration of treatment may be for 1 day, 2 days, 3 days, 4 days, 5 days, 6 days, or 7 days. Or, the duration of treatment may be for 1 week, 2 weeks, 3 weeks, 4 weeks, 5 weeks, or 6 weeks. Alternatively, the duration of treatment may be for 1 month, 2 months, 3 months, 4 months, 5 months, 6 months, 7 months, 8 months, 9 months, 10 months, 11 months, or 12 months. In still another embodiment, the duration of treatment may be for 1 year, 2 years, 3 years, 4 years, 5 years, or greater than 5 years. It is also contemplated that administration may be frequent for a period of time and then administration may be spaced out for a period of time. For example, duration of treatment may be 5 days, then no treatment for 9 days, then treatment for 5 days.

The timing of administration of the treatment relative to the disease itself and duration of treatment will be determined by the circumstances surrounding the case. Treatment could begin immediately, such as at the time of diagnosis, or treatment could begin later. Treatment could begin in a hospital or clinic itself, or at a later time after discharge from the hospital or after being seen in an outpatient clinic.

Although the foregoing methods appear the most convenient and most appropriate and effective for administration of a composition of the disclosure, by suitable adaptation, other effective techniques for administration, such as intraventricular administration, transdermal administration and oral administration may be employed provided proper formulation is utilized herein. In addition, it may be desirable to employ controlled release formulations using biodegradable films and matrices, or osmotic mini-pumps, or delivery systems based on dextran beads, alginate, or collagen.

A composition of the disclosure may also be administered in combination with standard treatment for neurodegenerative diseases. Standard treatment may depend on the type and severity of the neurodegenerative disease, as well as the general condition of the subject. Standard treatment for neurodegenerative diseases include, but is not limited to, cognition-enhancing medication such as cholinesterase inhibitors (e.g. donepezil (Aricept), galantamine (Razadyne), rivastigmine (Exelon)) and memantine (Namenda), physical exercise, nutrition (e.g. omega-3 fatty acids, curcumin, ginkgo, vitamin E), occupational therapy, speech therapy, physical therapy, carbidopa-levodopa, dopamine agonists (e.g. pramipexole (Mirapex), ropinirole (Requip), rotigotine (Neupro), apomorphine (Apokyn)), MAO-B inhibitors (e.g. selegiline (Eldepryl, Zelapar), rasagiline (Azilect)), catechol-o-methyltransferase (COMT) inhibitors (e.g. entacapone (Comtan), tolcapone (Tasmar)), anticholinergics (e.g. benztropine (Cogentin), trihexyphenidyl), amantadine, surgical procedures, tetrabenazine (Xenazine), antipsychotic drugs (e.g. haloperidol (Haldol), risperidone (Risperdal), quetiapine (Seroquel)), amantadine, levetiracetam (Keppra), and clonazepam (Klonopin).

Definitions

When introducing elements of the embodiments described herein, the articles "a," "an," "the," and "said" are intended to mean that there are one or more of the elements. The terms "comprising," "including," and "having" are intended to be inclusive.

The term "protein aggregate" as used herein refers to an accumulation of two or more misfolded proteins. A protein aggregate may be comprised of any protein or proteins with an aggregation-prone domain.

The term "aggregation-prone domain" as used herein refers to a region of the amino acid sequence of a protein that promotes the protein's aggregation with the same or other proteins.

The term "baseline" as used herein refers to the number and/or total quantity of protein aggregates in the central nervous system of the subject in the absence of compound.

The phrases "signs or symptoms of a neurodegenerative disease" or "symptoms of protein aggregation" as used herein refers to any symptom caused by the formation of protein aggregates. As used in the art, "a symptom" may be differentiated from "a sign" (e.g. clinical signs and clinical symptoms). However, for the purposes of this application, the term "symptoms" and "signs" are used interchangeably.

The term "biological sample" as used herein refers to a sample derived from a subject.

The term "acyl," as used herein alone or as part of another group, denotes the moiety formed by removal of the hydroxyl group from the group COOH of an organic carboxylic acid, e.g., RC(O)—, wherein R is $R^1$, $R^1O$—, $R^1R^2N$—, or $R^1S$—, $R^1$ is hydrocarbyl, heterosubstituted hydrocarbyl, or heterocyclo, and $R^2$ is hydrogen, hydrocarbyl, or substituted hydrocarbyl.

The term "acyloxy," as used herein alone or as part of another group, denotes an acyl group as described above bonded through an oxygen linkage (O), e.g., RC(O)O— wherein R is as defined in connection with the term "acyl."

The term "allyl," as used herein not only refers to compound containing the simple allyl group (CH$_2$=CH—CH$_2$—), but also to compounds that contain substituted allyl groups or allyl groups forming part of a ring system.

The term "alkyl" as used herein refers to straight or branched chain alkyl groups having in the range of about 1 to about 10 carbon atoms. A substituted alkyl group has one or more heteroatom substituents as described in the definition of substituted hydrocarbyl.

The term "alkylaryl" refers to alkyl substituted aryl groups, and "substituted alkylaryl" refers to alkylaryl groups further bearing one or more substituents.

The term "alkenyl" as used herein describes groups which are preferably lower alkenyl containing from two to eight carbon atoms in the principal chain and up to 20 carbon atoms. They may be straight or branched chain or cyclic and include ethenyl, propenyl, isopropenyl, butenyl, isobutenyl, hexenyl, and the like.

The term "alkoxide" or "alkoxy" as used herein is the conjugate base of an alcohol. The alcohol may be straight chain, branched, cyclic, and includes aryloxy compounds.

The term "alkynyl" as used herein describes groups which are preferably lower alkynyl containing from two to eight carbon atoms in the principal chain and up to 20 carbon atoms. They may be straight or branched chain and include ethynyl, propynyl, butynyl, isobutynyl, hexynyl, and the like.

The term "aromatic" as used herein alone or as part of another group denotes optionally substituted homo- or heterocyclic conjugated planar ring or ring system comprising delocalized electrons. These aromatic groups are preferably monocyclic (e.g., furan or benzene), bicyclic, or tricyclic groups containing from 5 to 14 atoms in the ring portion. The term "aromatic" encompasses "aryl" groups defined below.

The terms "aryl" or "Ar" as used herein alone or as part of another group denote optionally substituted homocyclic aromatic groups, preferably monocyclic or bicyclic groups containing from 6 to 12 carbons in the ring portion, such as phenyl, biphenyl, naphthyl, substituted phenyl, substituted biphenyl, or substituted naphthyl.

The term "arylalkynyl" refers to aryl-substituted alkynyl groups and "substituted arylalkynyl" refers to arylalkynyl groups further bearing one or more substituents.

The term "aroyl" refers to aryl-substituted species such as benzoyl and "substituted aroyl" refers to aroyl moieties further bearing one or more substituents as set forth above.

The term "cycloalkyl" refers to cyclic ring-containing moieties containing in the range of about 3 up to 7 carbon atoms and "substituted cycloalkyl" refers to cycloalkyl moieties further bearing one or more substituents.

The terms "halide" or "halo" as used herein alone or as part of another group refer to chlorine, bromine, fluorine, and iodine.

The term "heteroatom" refers to atoms other than carbon and hydrogen.

The term "heteroaromatic" as used herein alone or as part of another group denotes optionally substituted aromatic groups having at least one heteroatom in at least one ring, and having in the range of 2 up to 12 carbon atoms, or preferably 5 or 6 atoms in each ring. The heteroaromatic group preferably has 1 or 2 oxygen atoms and/or 1 to 4 nitrogen atoms in the ring, and is bonded to the remainder of the molecule through a carbon. Exemplary groups include furyl, benzofuryl, oxazolyl, isoxazolyl, oxadiazolyl, benzoxazolyl, benzoxadiazolyl, pyrrolyl, pyrazolyl, imidazolyl, triazolyl, tetrazolyl, pyridyl, pyrimidyl, pyrazinyl, pyridazinyl, indolyl, isoindolyl, indolizinyl, benzimidazolyl, indazolyl, benzotriazolyl, tetrazolopyridazinyl, carbazolyl, purinyl, quinolinyl, isoquinolinyl, imidazopyridyl, and the like. Exemplary substituents include one or more of the following groups: hydrocarbyl, substituted hydrocarbyl, alkyl, alkoxy, acyl, acyloxy, alkenyl, alkenoxy, aryl, aryloxy, amino, amido, acetal, carbamyl, carbocyclo, cyano, ester, ether, halogen, heterocyclo, hydroxyl, keto, ketal, phospho, nitro, and thiol.

The terms "heterocyclo" or "heterocyclic" as used herein alone or as part of another group denote optionally substituted, fully saturated or unsaturated, monocyclic or bicyclic, aromatic or non-aromatic groups having at least one heteroatom in at least one ring, and preferably 5 or 6 atoms in each ring. The heterocyclo group preferably has 1 or 2 oxygen atoms and/or 1 to 4 nitrogen atoms in the ring, and is bonded to the remainder of the molecule through a carbon or heteroatom. Exemplary heterocyclo groups include heteroaromatics as described above. Exemplary substituents include one or more of the following groups: hydrocarbyl, substituted hydrocarbyl, alkyl, alkoxy, acyl, acyloxy, alkenyl, alkenoxy, aryl, aryloxy, amino, amido, acetal, carbamyl, carbocyclo, cyano, ester, ether, halogen, heterocyclo, hydroxyl, keto, ketal, phospho, nitro, and thio.

The terms "hydrocarbon" and "hydrocarbyl" as used herein describe organic compounds or radicals consisting exclusively of the elements carbon and hydrogen. These moieties include alkyl, alkenyl, alkynyl, and aryl moieties. These moieties also include alkyl, alkenyl, alkynyl, and aryl moieties substituted with other aliphatic or cyclic hydrocarbon groups, such as alkaryl, alkenaryl and alkynaryl. Unless otherwise indicated, these moieties preferably comprise 1 to 20 carbon atoms.

The "substituted hydrocarbyl" moieties described herein are hydrocarbyl moieties which are substituted with at least one atom other than carbon, including moieties in which a carbon chain atom is substituted with a heteroatom such as nitrogen, oxygen, silicon, phosphorous, boron, or a halogen atom, and moieties in which the carbon chain comprises additional substituents. These substituents include alkyl, alkoxy, acyl, acyloxy, alkenyl, alkenoxy, aryl, aryloxy, amino, amido, acetal, carbamyl, carbamate, carbocyclo, cyano, ester, ether, halogen, heterocyclo, hydroxyl, keto, ketal, phospho, nitro, thio, trifluoromethyl, sulfonyl, sulfonamide, and the like.

EXAMPLES

The following examples are included to demonstrate various embodiments of the present disclosure. It should be appreciated by those of skill in the art that the techniques disclosed in the examples that follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Example 1

Combretastatin-A4 Analogs Reduce Protein Aggregation and Protect Against Neurodegeneration Several panels of drugs were tested for their ability to protect against formation of protein aggregates in the following model systems: (i) a cell-culture model of Alzheimer-like protein aggregation (SH-SY5Y-APP$_{Sw}$, a human neuroblastoma cell line expressing the Swedish mutation of Amyloid Precursor Protein (APP), and thus predisposed to form β-amyloid aggregates; (ii) C. elegans strain CL4176, a model of Alzheimer-like amyloidopathy that can be induced to express human Aβ$_{1-42}$ in muscle, and declines sharply in motility 24-42 hours after induction unless protected by effective drugs; (iii) C. elegans strain CL2355, a model of Alzheimer-like amyloidopathy that expresses human Aβ$_{1-42}$ in all neurons after upshift induction (as in ii, above), and consequently loses its normal chemotactic responses; (iv) C. elegans strain NL5901, a model of Parkinson's disease that expresses α-synuclein:: GFP in neurons, forming fluorescent aggregates with age; aggregates are scored by number and intensity of GFP foci, or scored for neuron loss with age by dye-filling; and (v) C. elegans strain AM141, a model of Huntington-like polyglutamine aggregation, which expresses Q40::YFP (a 40-glutamine tract fused in-frame to yellow fluorescent protein) in muscle cells and accumulates aggregates during aging.

Figure 2A:
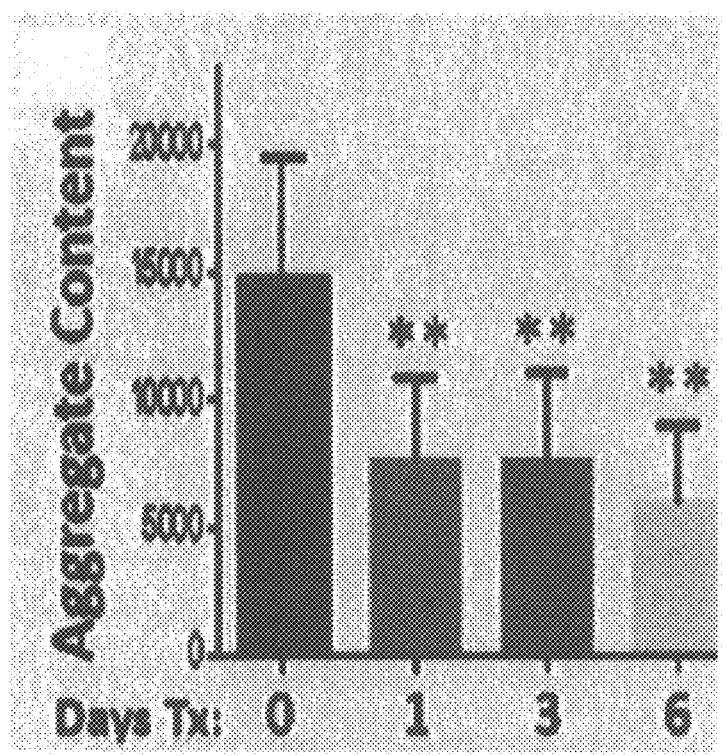
FIG. 2A and FIG. 2B depict graphs showing that PNR-5-02 reduces Q40 aggregated in just 1 day. $C.$ $elegans$ (AM141) adults were imaged at 7 days of adult age and quantified for intensity (FIG. 2A) and number (FIG. 2B) of Q40::YFP aggregates after 0, 1, 3, or 6 d of exposure to 50-nM PNR-5-02. Treated worms differ from untreated worms ("Days Tx"=0) by 2-tailed t test: *P<0.01; **P<1E-4.
Figure 2B:
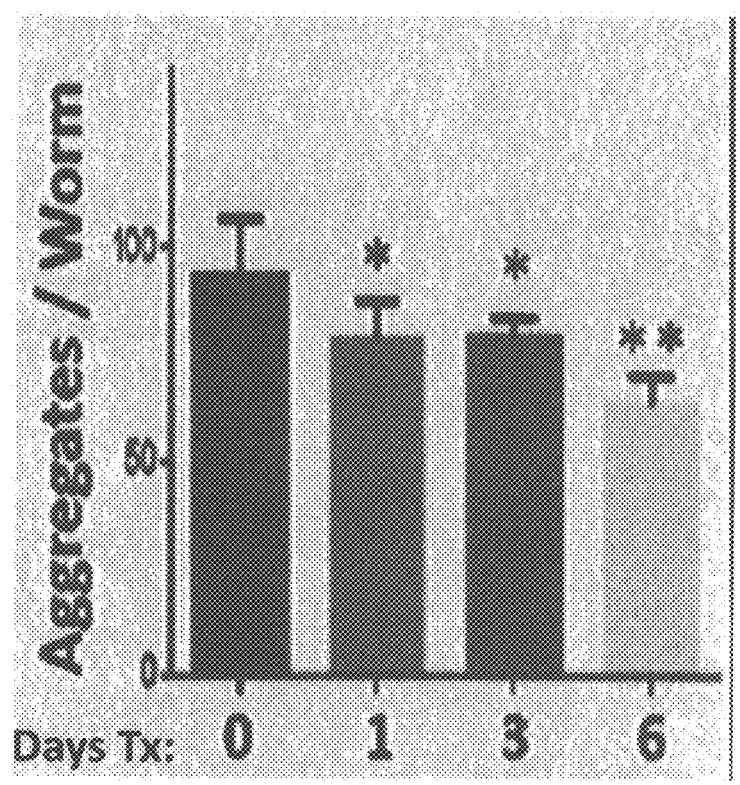

The drug PNR-5-02 (FIG. 1), synthesized as an analog of combretastatin-A4 (CA4), was protective in all five of the above assays. Additional drugs, protective in at least two of those assays but not yet tested in the other assays, include PNR7-74, a CA4 analog with a triazole ring added to PNR-5-02. C. elegans exposure to PNR-5-02 for just 1 day was as effective in reducing AM141 aggregates as 6-days exposure, when treatments immediately preceded assay (FIG. 2A and FIG. 2B).

Figure 3:
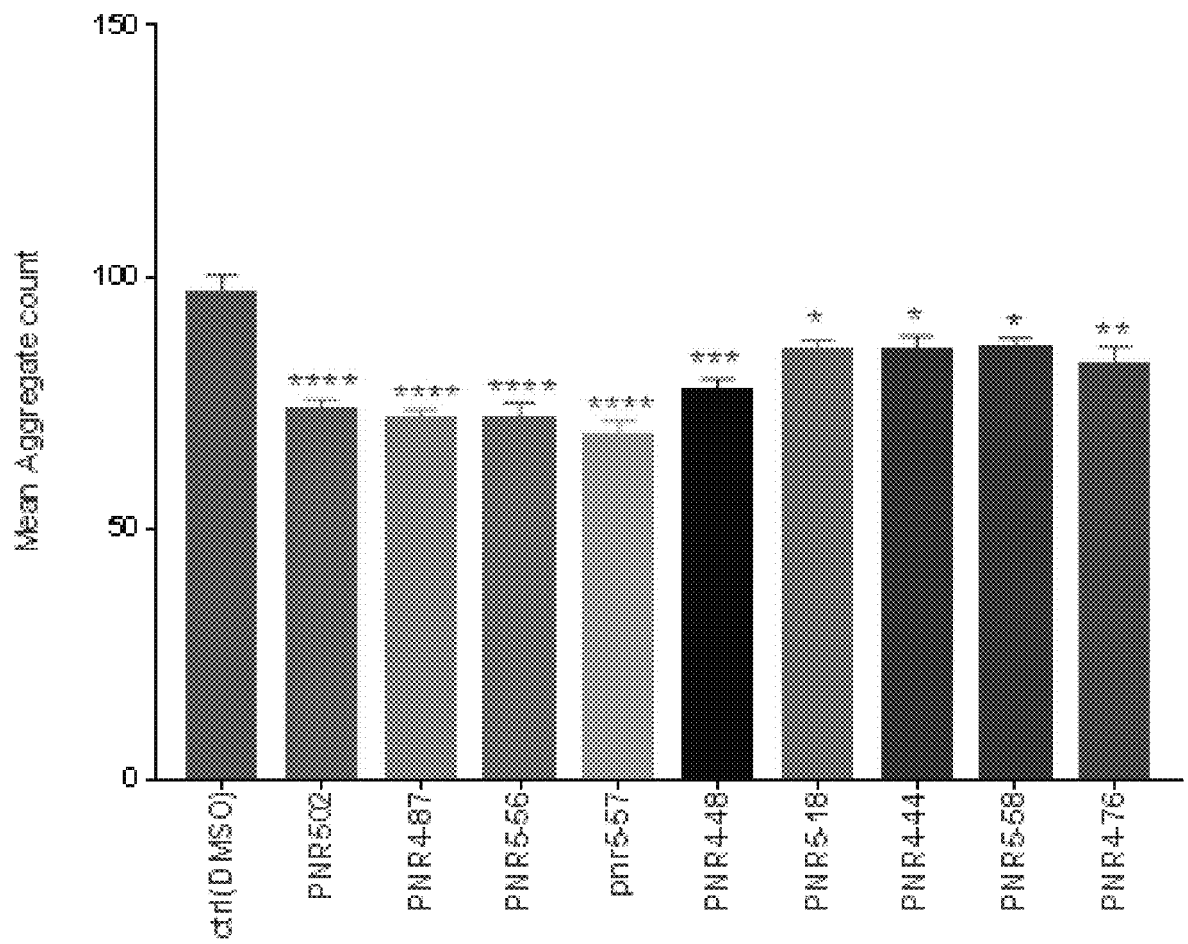
FIG. 3 depicts a graph showing reduction of protein aggregation in a $C.$ $elegans$ model of Huntington's disease or other neurodegenerative diseases featuring aggregates that contain polyglutamine tracts. Strain AM141, which expresses Q40::YFP in muscle, undergoes age-progressive accumulation of aggregate foci. PNR-5-02 analogues confer at least 30% reduction in formation of aggregate foci (****=P<0.00005 and *=P<0.01). PNR-5-18, PNR-4-44, PNR-5-58, and PNR-4-76 reduced aggregate count by ~20%. PNR-5-02, PNR-4-87, PNR-5-56, and PNR-5-57 reduced aggregates ≥30%.

C. elegans were exposed to additional analogs of combretastatin-A4 (CA4) and were observed to have at least a 30% reduction in formation of aggregation foci (FIG. 3).

Figure 4:
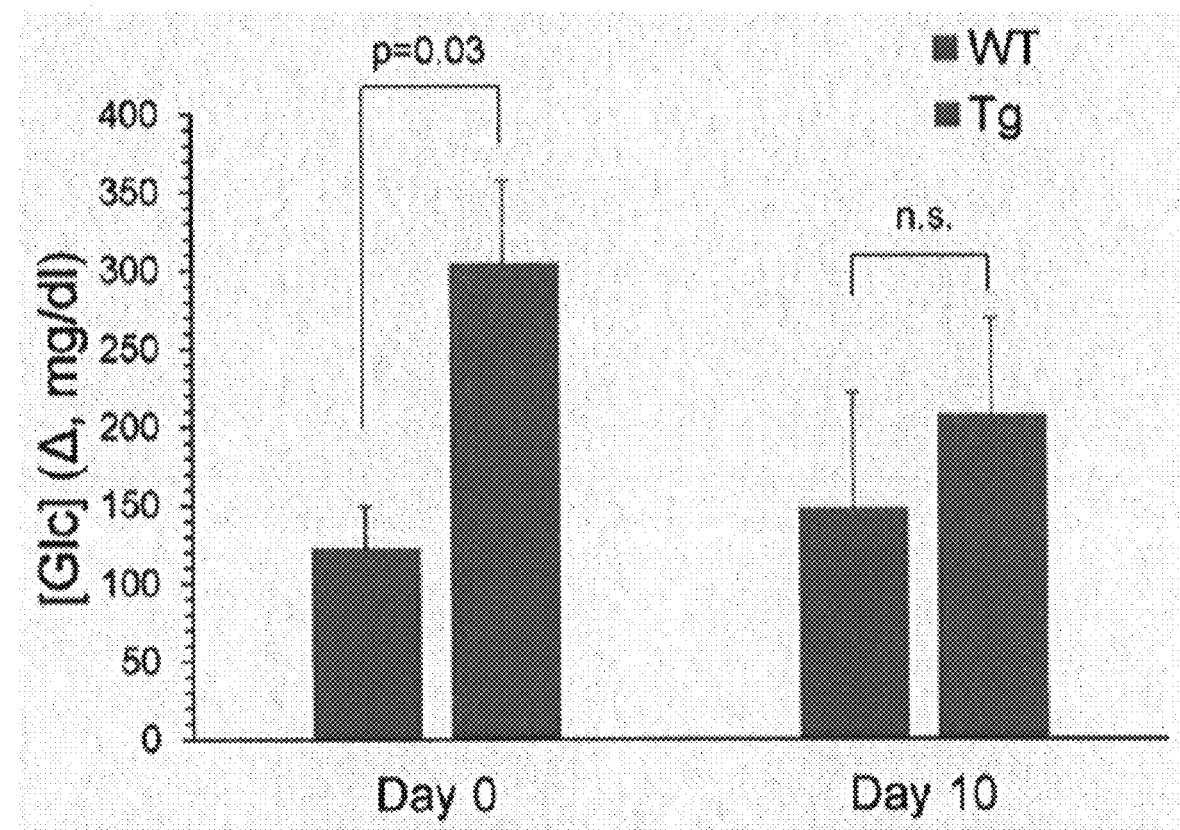
FIG. 4 depicts a graph showing that PNR-5-02 corrects the prediabetic phenotype of Aβ-transgenic mice. BRI-Aβ$_{1-42}$ mice, which secrete amyloid β-peptide (Aβ$_{42}$) from central-nervous-system neurons, were compared to wild-type littermates in a glucose tolerance test (GTT). Mice were fasted 5 hours, then injected intra-peritoneally (IP) with 200 g/kg glucose. Blood glucose concentration was measured 30 minutes later; values represent change from baseline±SEM. All mice were then IP injected with PNR-5-02 (5.7 μmole/kg), daily for 10 days, followed by another GTT. BRI-Aβ$_{42}$ mice initially had impaired glucose tolerance (red bars) relative to normal littermates (green bars), but this difference became insignificant after PNR-5-02 treatment. No adverse effects of PNR-5-02 treatment were noted.

A preliminary test of PNR-5-02 was conducted in transgenic mice (BRI-Aβ$_{42}$) that secrete Aβ$_{42}$ from CNS neurons, and consequently form intra-neuronal amyloid plaque as they age. These mice have a pre-diabetic phenotype, which was also reported for other amyloid-producing mouse models of AD. In a glucose tolerance test (GTT), BRI-Aβ$_{42}$ mice showed more than double the blood glucose of their wild-type littermates. This appeared to be largely corrected by just 10 days of treatment with PNR-5-02 at 5.7 μmole/kg/day (FIG. 4).

Figure 5:
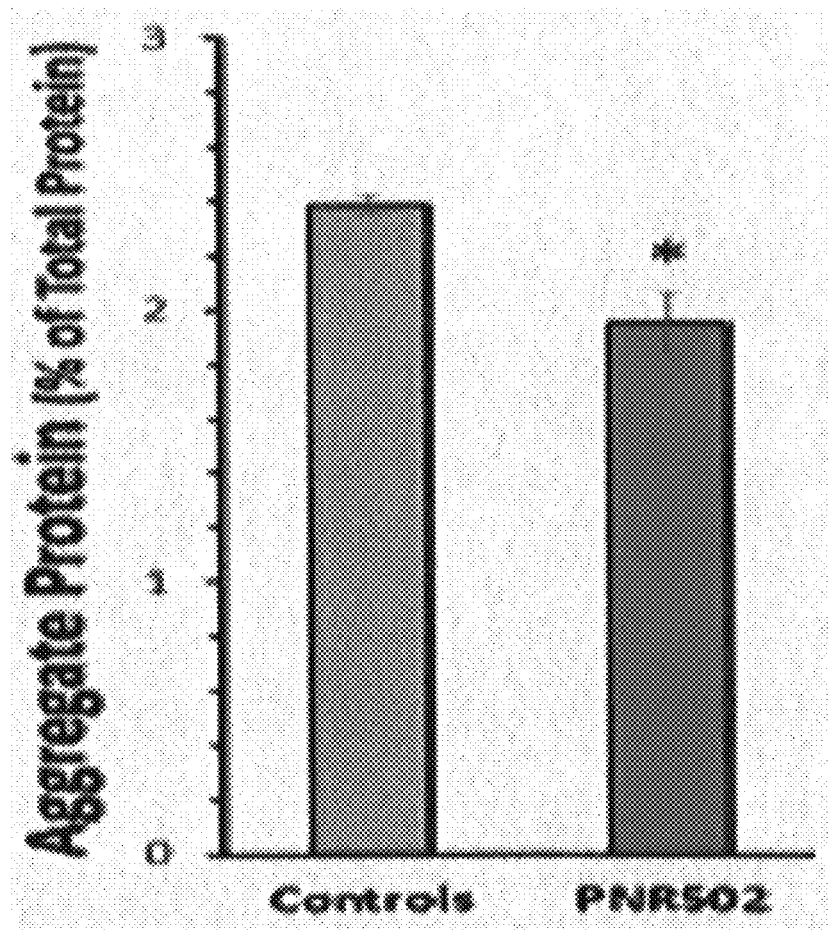
FIG. 5 depicts a graph showing that PNR-5-02 reduces protein aggregates in cerebral cortex of mice expressing an Aβ transgene. Total protein and sarcosyl-insoluble protein aggregates were prepared from cerebral cortex of SRI-Aβ$_{42}$ mice, treated as in FIG. 4. Aliquots were separated on SDS-acrylamide gels and stained with Sypro Ruby (Molecular Probes). Gel lanes were scanned, and for each aggregate-protein lane the integral of intensity was normalized to the integral for total protein. *$P<0.03$ by 1-tailed heteroscedastic t test.

Total protein and total sarcosyl-insoluble aggregates were isolated from cerebral cortex of BRI-Aβ$_{42}$ mice, sacrificed after 10 daily IP injections with PNR-5-02 (as above) or vehicle. Protein aliquots were suspended in Laemmli buffer and resolved by SDS-acrylamide gel electrophoresis, and quantitated by protein-specific fluorescent staining. Results, presented in FIG. 5 as the percent of aggregate protein after normalization to total protein from the same sample, indicate an 18% reduction in aggregates for PNR-5-02-treated mice. Larger aggregates (at the top of each gel lane) were reduced >40%.

A biotinyl version of PNR-5-02 was synthesized and used to pull down proteins from the lysate of Alzheimer hippocampus, to which it had bound, using streptavidin-coated magnetic beads. Bead-adherent proteins were mildly digested with trypsin, and the partially-digested peptides retained on the beads were identified by standard LC-MS/MS tandem mass spectrometry. Exceptional levels of identification (high spectral counts) were anticipated for peptides directly bound by PNR-5-02, and the top candidates are listed in Table 1.

Figure 6:
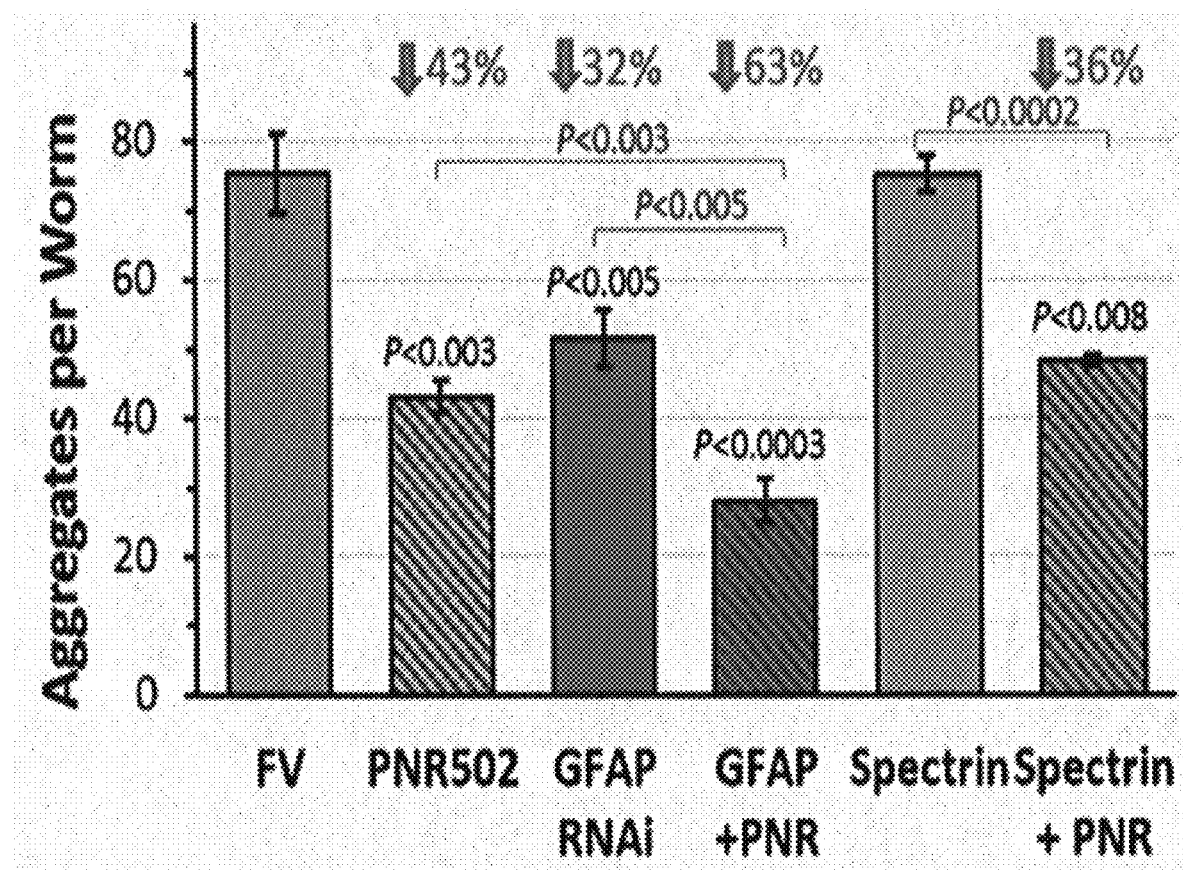
FIG. 6 depicts a graph showing that GFAP RNAi shows partial redundancy with PNR-5-02 protection from aggregation. Aggregates in AM141 worms were counted at 5 days post-hatch (±SEM), in worms treated continuously from hatch with PNR-5-02, RNAi targeting GFAP (glial fibrillary acidic protein) or spectrin, the same RNAi constructs plus PNR-5-02, or vehicle with feeding vector (FV) as control. P values over bars: 2-tailed t tests of difference from control (FV) counts. P values over brackets: 2-tailed t tests of difference between groups connected by each bracket.

The C. elegans ortholog of each of these proteins was "knocked down" (suppressed by RNA interference, RNAi) in turn, and the results implicate GFAP, β-tubulin, and plectin (among the chief direct-binding targets of PNR-5-02 in Alzheimer Disease hippocampus) as mediators of its protective benefits in C. elegans aggregation models (FIG. 6). Computer modeling of the interactions of PNR-5-02 and potential targets including GFAP (ΔG=−8 and −7 kcal/mole for two top peptides) and β-tubulin (ΔG=−8 kcal/mole) indicates that both of these drug:protein interactions should form spontaneously.

Taken together, the data suggest that PNR-5-02 and its analogs (in particular PNR-7-74) target GFAP (glial fibrillary acidic protein). Additional possible secondary targets include tubulin β chain, myelin basic protein, histones H2B and H1.2, and α-crystallin B chain, which are also useful drug targets in prevention and/or reversal of protein aggregation.

TABLE 1

Top proteins and peptides binding biotinyl-PNR-5-02

| Protein | Acc.ID | kDa | Hits/kDa | Hits/Peptide (length) |
|---|---|---|---|---|
| Glial fibrillary acidic protein | GFAP | 50 | 6.3 | 62 (25 a.a.) |
| | | | | 33 (12 a.a.) |
| Tubulin β chains | TUBB | 50 | 2.9 | 16 (19 a.a.) |
| Myelin basic protein | MBP | 50 | 2.1 | 12 (12 a.a.) |
| Histone H2B | H2B3B | 14 | 2.1 | 9 (8 a.a.) |
| α crystallin B chain | CRYAB | 20 | 1.7 | 10 (24 a.a.) |

Human neuroblastoma cells (SH-SY5Y-APP$_{sw}$), express the Swedish mutant of Amyloid Precursor Protein (APP$_{sw}$) and therefore are predisposed to form amyloid aggregate. SH-SY5Y-APP$_{sw}$ cells were suspended in trypsin/EDTA from an exponentially growing culture, counted in a Coulter ZF cell counter, and plated in 96-well plates at 10,000 cells/well, and grown for 16 hours at 37° C. in "DMEM+F12" (Life Technologies) supplemented with 10% fetal calf serum. Drugs are then added (typically at 4 doses each, in triplicate) and cells were cultured for 48 hours. Each plate can thus assay 6 drugs, each followed by vehicle-only control wells. Cells were fixed in 4% formaldehyde and stained in a dark container with 0.1% (w/v) Thioflavin-T. After 4 washes in PBS, cells were covered with Antifade+ DAPI (Life Technologies) and fluorescence images were captured in blue and green channels with a Nikon DS-Fi2 camera, mounted on a Nikon C2 inverted microscope with motorized stage for automated well-by-well imaging. The blue channel shows DNA staining, and thus allows the number of nuclei per microscope field to be counted; the green channel shows Thioflavin-T fluorescence, indicative of amyloid plaque content. Amyloid fluorescence is then divided by the number of nuclei, to obtain relative amyloid content per cell.

Figure 7:
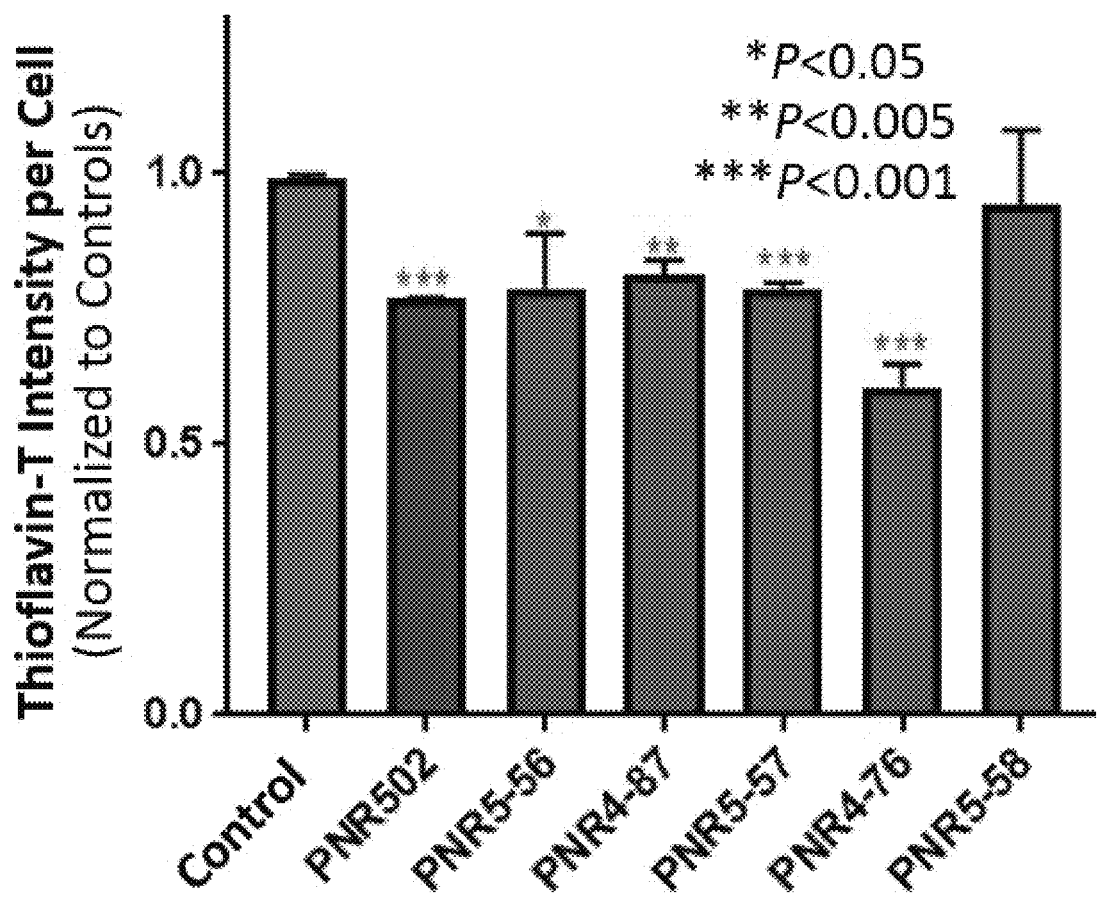
FIG. 7 depicts a graph showing PNR-5-02 analogues reduce amyloid accumulation in human neuroblastoma cells overexpressing amyloid precursor protein (APP$_{Sw}$). SH-SY5Y-APP$_{Sw}$, human neuroblastoma cells overexpressing a mutant amyloid precursor protein (APP$_{sw}$) associated with familial AD. Elevated APP$_{Sw}$ leads to substantial formation of amyloid plaque, visualized by fluorescence microscopy after Thioflavin-T staining on day 3 of culture. Thioflavin-fluorescence intensity in these cells was reduced significantly by treatment with PNR-5-02 analogues.

Thioflavin-fluorescence intensity in these cells were reduced significantly by PNR-5-02 analogues treatment (PNR-4-87 showed 34% reduction; PNR-5-58 showed 54%; $P<0.0001$) (FIG. 7).

Figure 8:
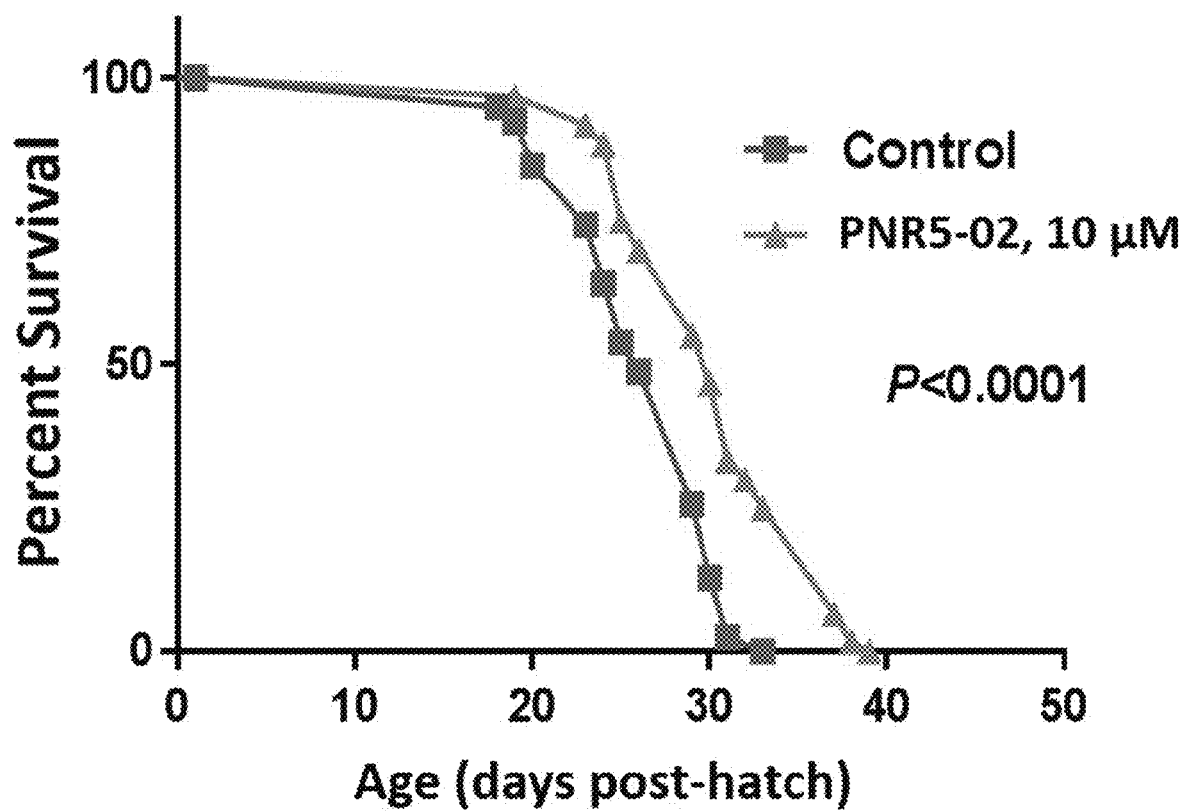
FIG. 8 depicts a graph showing that PNR-5-02 increase *C. elegans* life span. The effect of PNR-5-02 on *C. elegans* life span, at different concentrations both mean and maximum life span of the nematode life span is extended by 15%.

Synchronized eggs (expected to hatch at approximately the same time) were placed on 60-mm nutrient-agar plates to which either vehicle (0.013% DMSO, v/v) for controls or PNR-5-02 (10 μM in 0.013% DMSO) was added. Worms were transferred to fresh plates daily for 7 days, and on alternate days thereafter, scoring worms as alive if they moved spontaneously or in response to gentle prodding. Worms lost for reasons other than natural death were censored (removed from mortality calculations) from that date. PNR-5-02 extended the nematode life span by 15% (FIG. 8).

What is claimed is:

1. A method to reduce protein aggregates in the central nervous system of a subject, the method comprising administering to the subject a composition comprising a compound that binds glial fibrillary acidic protein (GFAP), wherein the compound is a compound of Formula (I):

(I)

wherein
- R$^1$, R$^2$, R$^3$, R$^4$, and R$^5$ are hydrogen;
- R$^7$, R$^8$, R$^9$, R$^{10}$, and R$^{11}$ are independently selected from hydrogen or alkoxy;
- R$^6$ is CN;
- X is C or S;
- Y is N, S, or NH;
- ----- independently are a single bond that is present or absent, with the proviso that both ----- are not present at the same time; and wherein the protein aggregates contain or are initiated by Aβ1-42, β-amyloid, α-synuclein, and/or a polyglutamine array expansion protein.

2. The method of claim 1, wherein the compound also binds tubulin β chain (TUBB), myelin basic protein (MPB), histone H2B (H2B3B), and/or α-crystallin B chain (CRYAB).

3. The method of claim 1, wherein R$^8$, R$^9$, and R$^{10}$ are methoxy and R$^7$ and R$^{11}$ are hydrogen.

4. The method of claim 1, wherein the protein aggregation is reduced by at least 20%.

5. The method of claim 1, wherein the compound is selected from the group consisting of:

(PNR-4-87)

(PNR-5-02)

(PNR-5-56)

(PNR-5-57)

6. A method to reduce protein aggregates in the central nervous system of a subject, the method comprising administering to the subject a composition comprising a compound that binds glial fibrillary acidic protein (GFAP), wherein the compound is (PNR-5-02)

wherein the protein aggregates contain or are initiated by Aβ1-42, β-amyloid, α-synuclein, and/or a polyglutamine array expansion protein.

7. A method to reduce protein aggregates in the central nervous system of a subject, the method comprising administering to the subject a composition comprising a compound that binds glial fibrillary acidic protein (GFAP), wherein the compound is a compound of Formula (I):

(I)

wherein
- R$^1$, R$^2$, R$^3$, R$^4$, and R$^5$ are hydrogen;
- R$^7$, R$^8$, R$^9$, R$^{10}$, and R$^{11}$ are independently selected from hydrogen or alkoxy;
- R$^6$ is CN;
- X is C;
- Y is N, S, or NH;
- ----- independently are a single bond that is present or absent, with the proviso that both ----- are not present at the same time; and wherein the protein aggregates contain or are initiated by Aβ1-42, β-amyloid, α-synuclein, and/or a polyglutamine array expansion protein.

* * * * *